US012614926B2

(12) United States Patent
Covic et al.

(10) Patent No.: US 12,614,926 B2
(45) Date of Patent: Apr. 28, 2026

(54) HIGH POWER MAGNETICS IN WIRELESS CHARGING SYSTEMS

(71) Applicant: Auckland UniServices Limited, Auckland (NZ)

(72) Inventors: Grant Anthony Covic, Auckland (NZ); Duleepa Jayanath Thrimawithana, Auckland (NZ); Feiyang Lin, Auckland (NZ); Seho Kim, Auckland (NZ); Simon Bickerton, Waiheke Island (NZ); Patrick Alexander John Lawton, Auckland (NZ); Thomas David Allen, Auckland (NZ)

(73) Assignee: Auckland UniServices Limited, Auckland (NZ)

( * ) Notice: Subject to any disclaimer, the term of this patent is extended or adjusted under 35 U.S.C. 154(b) by 0 days.

(21) Appl. No.: 18/693,001

(22) PCT Filed: Sep. 26, 2022

(86) PCT No.: PCT/IB2022/059143
§ 371 (c)(1),
(2) Date: Mar. 18, 2024

(87) PCT Pub. No.: WO2023/047380
PCT Pub. Date: Mar. 30, 2023

(65) Prior Publication Data
US 2025/0015633 A1 Jan. 9, 2025

(30) Foreign Application Priority Data
Sep. 24, 2021 (NZ) ........................................ 780632

(51) Int. Cl.
*H02J 50/00* (2016.01)
*H01F 1/34* (2006.01)
(Continued)

(52) U.S. Cl.
CPC ............ *H02J 50/005* (2020.01); *H01F 1/344* (2013.01); *H01F 3/02* (2013.01); *H01F 27/08* (2013.01); *H02J 50/12* (2016.02); *H02J 50/70* (2016.02)

(58) Field of Classification Search
CPC .......... H02J 50/005; H02J 50/12; H02J 50/70; H02J 7/02; H02J 2310/48; H02J 50/402;
(Continued)

(56) References Cited

U.S. PATENT DOCUMENTS 9,384,885 B2 * 7/2016 Karalis ................... H02J 50/80
10,333,293 B2 * 6/2019 Budhia ................. B60L 53/305
(Continued)

FOREIGN PATENT DOCUMENTS

WO WO-2019074378 A1 * 4/2019

OTHER PUBLICATIONS

International Preliminary Report on Patentability and Written Opinion in counterpart International Application No. PCT/US2022/059143, mailed Apr. 4, 2024, 10 pages.
(Continued)

*Primary Examiner* — Rexford N Barnie
*Assistant Examiner* — Michael J Warmflash
(74) *Attorney, Agent, or Firm* — Edell, Shapiro & Finnan, LLC

(57) ABSTRACT

The present invention relates to magnetic structures for wireless power transfers systems. In particular the invention relates to improved magnetic and ferrite layouts as well as pad designs and methods of predicting and preventing thermal failure of high-power ferrite structures. In part it relates to a wireless power transfer pad magnetic structure comprising at least two adjacent blocks are spaced apart by an inter-section spacing configured to reduce circulating flux in the layer. In part it relates to a wireless power transfer pad
(Continued)

Figure 12b magnetic structure comprising a first surface configured to locate nearer a wireless power transfer coil than a second surface wherein the relative magnetic permeability of the magnetic structure increases with distance from the first surface. In part it relates to a method of preparing a magnetically permeable block for a wireless power transfer pad, the method comprising: thermally pre-cracking the magnetically permeable block.

20 Claims, 26 Drawing Sheets

(51) Int. Cl.

| | |
|---|---|
| *H01F 3/02* | (2006.01) |
| *H01F 27/08* | (2006.01) |
| *H02J 50/12* | (2016.01) |
| *H02J 50/70* | (2016.01) |

(58) Field of Classification Search
CPC .. H02J 50/90; H02J 50/10; H02J 50/40; H02J 50/80; H01F 1/344; H01F 3/02; H01F 27/08; H01F 7/0221; H01F 27/008; H01F 27/346; H01F 1/00; H01F 38/14; Y02T 10/70; Y02T 10/7072; Y02T 90/12; Y02T 90/14

See application file for complete search history.

(56) References Cited

U.S. PATENT DOCUMENTS

| | | | | |
|---|---|---|---|---|
| 10,673,274 B2 * | 6/2020 | Boys | ..................... | B60L 53/30 |
| 11,621,585 B2 * | 4/2023 | Karalis | ................ | B60L 53/126 |
| | | | | 307/104 |
| 11,651,891 B2 * | 5/2023 | Boys | ..................... | B60L 53/122 |
| | | | | 191/10 |
| 2012/0025602 A1 * | 2/2012 | Boys | ....................... | H04B 5/79 |
| | | | | 307/104 |
| 2012/0217111 A1 * | 8/2012 | Boys | ..................... | B60L 53/126 |
| | | | | 191/10 |
| 2013/0033118 A1 * | 2/2013 | Karalis | ................ | B60L 53/126 |
| | | | | 307/104 |
| 2013/0270921 A1 * | 10/2013 | Boys | ....................... | H02J 50/10 |
| | | | | 307/104 |
| 2016/0028240 A1 * | 1/2016 | Boys | ....................... | B60L 53/30 |
| | | | | 307/104 |
| 2018/0174734 A1 * | 6/2018 | Budhia | ................... | H01F 27/26 |

OTHER PUBLICATIONS

Pries et al., "A 50-kW Three-Phase Wireless Power Transfer System Using Bipolar Windings and Series Resonant Networks for Rotating Magnetic Fields", IEEE Transactions on Power Electronics, May 2020, pp. 4500-4517, vol. 35, No. 5.

Ibrahim et al., "A 50-kW Three-Channel Wireless Power Transfer System With Low Stray Magnetic Field", IEEE Transactions on Power Electronics, Sep. 2021, pp. 9941-9954, vol. 36, No. 9.

Bosshard et al., "Multi-Objective Optimization of 50 kW/85 KHz IPT System for Public Transport", IEEE Journal of Emerging and Selected Topics on Power Electronics, Dec. 2016, pp. 1370-1382, vol. 4, No. 4.

Lammle et al., "Investigating of the Influence of Split Ferrite Tiles in an Inductive Charging System with FEM-Simulation", IEEE PELS Workshop on Emerging Technologies: Wireless Power Transfer (WoW), 2019, pp. 65-70.

International Search Report and Written Opinion in counterpart International Application No. PCT/IB2022/059143, mailed Dec. 21, 2022, 17 pages.

* cited by examiner

Staggered layers for
structural strength 40        30        20

45
Heat pipes or
channels

Heat flow

Ferrite
25

Polymer
30

HIGH POWER MAGNETICS IN WIRELESS CHARGING SYSTEMS

TECHNICAL FIELD OF THE INVENTION

The present invention relates to magnetic structures for wireless power transfers systems (also known as inductive power transfer systems). Such magnetic structures are often referred to as pads. The invention in particular relates to improved magnetic layout and ferrite layouts as well as to pad designs and methods of predicting and preventing thermal failure of high-power ferrite structures.

BACKGROUND OF THE INVENTION

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

With the release of SAE J2954 (Wireless Power Transfer for Light-Duty Plug-in/Electric Vehicles and Alignment Methodology J2954_202010), stationary IPT wireless charging of electric vehicles (EVs) has been adopted by industry as a user friendly, safe and robust alternative to plug-in charging stations rated up to 10 KW. However, there is currently no standardized high-power (>10 KW) Wireless Charging System (WCS) that serves as an alternative to plug-in fast/rapid charging. For wireless charging to be fully adopted by the EV industry, standardized fast-charging IPT systems need to be developed that are versatile, practical, and meet emissions requirements.

Commercial Electric Fleet Vehicles (EFV) such as taxis, courier vans and light trucks will benefit most from standardized fast-charging stations at taxi ranks and loading bays where they receive a 20 to 30% charge over a 10-minute period during onboarding/loading. This prevents disruption and reduces the risk associated with drivers handling high-power plug-in charging equipment.

The study of high power IPT systems ranging from 20 to 300 kW has been of interest recently. Multiphase systems that achieve compact magnetics or reduce emissions through magnetic field cancellation have been developed such as in J. Pries, V. P. N. Galigekere, O. C. Onar and G. Su, "*A 50-kW Three-Phase Wireless Power Transfer System Using Bipolar Windings and Series Resonant Networks for Rotating Magnetic Fields,*" in IEEE Transactions on Power Electronics, vol. 35, no. 5, pp. 4500-4517 May 2020 and A. U. Ibrahim, W. Zhong and M. D. Xu, "*A 50-KW Three-Channel Wireless Power Transfer System With Low Stray Magnetic Field,*" in IEEE Transactions on Power Electronics, vol. 36, no. 9, pp. 9941-9954 September 2021. Modular high-power systems are also considered for their power level scaling ability and market adoptability.

Various multi-objective optimization techniques have also been explored that use cost functions to produce Pareto efficient or best fit magnetics solutions. These approaches are considered with optimizing designs, usually with the goals of high-power density, high efficiency, and low materials cost. Conventional IPT magnetic topologies such as Circular and Double-D Pads (CP, DDP) have been considered to optimize for high-power systems, and high-power density electronics have been investigated such as in R.

Bosshard and J. W. Kolar, "*Multi-Objective Optimization of 50 kW/85 kHz IPT System for Public Transport,*" in IEEE Journal of Emerging and Selected Topics in Power Electronics, vol. 4, no. 4, pp. 1370-1382, December 2016.

Ignoring ferrite magnetic flux density distribution can be costly at high power. As an example, in T. Lämmle, N. Parspour and C. Fuchs, "*Investigation of the Influence of Split Ferrite Tiles in an Inductive Charging System with FEM-Simulation,*" 2019 IEEE PELS Workshop on Emerging Technologies: Wireless Power Transfer (WoW), 2019, pp. 65-70 an IPT pad design with windings exiting the pad downward through the ferrite structure was shown to be prone to high levels of circulating magnetic flux. T. Lämmle, N. Parspour and C. Fuchs, proposed a solution for aligned pads that reduced circulating flux by including large airgaps in the ferrite structure distributed between each adjacent ferrite tile. However, this method of distributing airgaps in the ferrite structure also reduces coupling between the primary and secondary pads. Therefore, more volt amps are required to deliver the same power, resulting in a larger magnetic field in the ferrites.

Further, there is currently limited research that investigates the cause and effect of thermal related failure of ferrite structures within high power IPT magnetics.

BRIEF DESCRIPTION OF THE INVENTION

The system presented here uses a heuristic design approach to produce a working system that meets design constraints. An objective of the system was to provide insight into magnetic and thermal behaviour of high-power magnetics as a first step towards producing optimized solutions. Previous research into high-power magnetics has focused on managing public exposure to leakage fields and obtaining high-power density magnetics. However, high magnetic flux density (B) within the ferrite structure and resulting thermal problems are either assumed to be solved by active cooling or are simply ignored. An alternative method of distributing airgaps in the ferrite structure that does not reduce coupling, and reduces circulating flux is advantageous.

Although wireless power transfer pad structures with magnetically permeable blocks such as ferrimagnetic blocks exist in the art, an aspect of at least one of the configurations disclosed herein includes the realisation that there are problems with field loss or splay and/or ensuring maximum efficiency and performance. It is therefore an object of the invention to go at least some way to overcoming one or more of the above disadvantages, or at least to provide choice to the public The magnetic structures referred to in this description is discussed with reference to ferrite. It should be understood that other magnetic materials that are appropriate for wireless power transfer magnetic structures may be used instead of ferrite within the embodiments disclosed throughout. Also, as used herein, "ferrite" generally refers to a material that includes ferric oxide in combination with one or more other materials. A structure made of a ferrite material has a magnetic permeability, structure and shape that provides a reluctance path for the magnetic field that is lower than the reluctance path through air. Magnetically permeable materials have relatively high magnetic permeability compared to the permeability of air.

As used herein, "permeability" refers to the relative permeability which is equal to the ratio of the absolute permeability of the material ($\mu\_a$) to the permeability of free space ($\mu\_o$).

In a first aspect a wireless power transfer pad magnetic structure is provided comprising: a layer comprising a plurality of magnetically permeable blocks, adjacent blocks spaced apart by an inter-block spacing, wherein at least two adjacent blocks are spaced apart by an inter-section spacing, the inter-section spacing greater than the inter-block spacing, the inter-section spacing configured to reduce circulating flux in the layer. The spacing reduces circulating flux while maintaining coupling flux of the power transfer.

Optionally a wireless power transfer pad magnetic structure the inter-section spacing divides the layer into a plurality of sections. In other cases there may be a single section with a cut or divide. Optionally there are four or six sections.

Optionally the magnetic permeability of each of the magnetically permeable blocks increases with the depth of the block. The blocks may have the features of the aspects described below.

Optionally the inter-section spacing is configured perpendicular to the expected circulating flux in use of the wireless power transfer pad. This breaks the path of the circulating flux reducing the amount circulating.

Optionally the inter-section spacing is between two and four times larger than the inter-block spacing.

Optionally the inter-section spacing is parallel and/or perpendicular to the edges of the layer.

Optionally the inter-section spacing is configured to allow a wireless power transfer coil to exit between the adjacent blocks. This reduces the vertical distance the coil must travel, and the vertical distance of the coil induces the circulating flux.

Optionally the inter-block spacing is between 0.1 and 1 mm.

Optionally the inter-section spacing extends from an outer perimeter of the magnetic structure to an inner perimeter of the magnetic structure.

Optionally the inter-section spacing is configured parallel to coupling flux of the wireless power transfer pad magnetic structure, in use.

Optionally the magnetic structure forms a shape with an inner cut-out, such as a hollow rectangle, a hollow square, a toroid. The inner cut-out creates an inner portion without magnetically permeable material. This may be advantageous for some coil arrangements. The intersection spacings may span between the outer perimeter and the inner portion.

Optionally comprising inter-section spacings on opposite sides of the inner cut-out, the inter-section spacings aligned with one another. This may be seen as a single line passing through the inner cut-out.

Optionally the inter-section spacing is located at a midpoint of a side of magnetic structure and substantially perpendicular to that side of the magnetic structure.

Optionally the magnetically permeable blocks comprise ferrite.

In another aspect a wireless power transfer pad magnetic structure is provided, comprising: a layer comprising a plurality of magnetically permeable blocks, adjacent blocks spaced apart by a first spacing, wherein at least two adjacent blocks are spaced apart by second spacing, the second spacing greater than the first spacing, the second spacing configured to reduce circulating flux in the layer. The inter-block and inter section spacings may be referred to as first and second spacings. The at least two adjacent blocks preferably span a width of the layer between an outer diameter and an inner diameter of the layer.

In another aspect a method of configuring a wireless power transfer pad magnetic structure is provided comprising: configuring a plurality of magnetically permeable blocks into a layer, adjacent blocks spaced apart by an inter-block spacing, wherein at least two adjacent blocks in the layer are spaced apart by an inter-section spacing, the inter-section spacing greater than the inter-block spacing, the inter-section spacing configured to reduce circulating flux in the layer.

In a further aspect a method of providing a wireless power transfer pad magnetic structure is provided comprising: configuring a plurality of magnetically permeable blocks into a layer, wherein the blocks in the layer are divided into sections and an inter-block spacing between edges of adjacent blocks in each section is substantially the same, and the inter-block spacing is aligned between blocks in each section, and wherein there is an inter-section spacing between edges of adjacent sections, the inter-section spacing being greater than the inter-block spacing.

Optionally the sections comprise four quadrants, and the inter-quadrant spacing between edges of adjacent quadrants is greater than the inter-block spacing. Optionally the layer has X and Y axes which divide the layer into the quadrants. Optionally the layer is substantially planar. Optionally the layer comprises a hollow polygon, such as a hollow rectangle or hollow square. Optionally the method further comprises configuring inter-section spacing to reduce circulating magnetic flux. Optionally the method further comprises configuring the inter-block spacing to improve coupling flux. Optionally further comprising placing a wireless power transfer coil on one side of the layer.

In a further aspect a wireless power transfer pad is provided comprising: A wireless power transfer coil, and a magnetic structure as described by the other aspects.

Optionally the inter-section spacing is configured substantially parallel to coupling flux generated by the wireless power transfer coil, in use.

Optionally the inter-section spacing is configured substantially perpendicular to the circulating flux generated by the wireless power transfer coil, in use. Optionally the coil exits through the inter-section spacing. Optionally the coil crosses the inter-section spacing substantially perpendicularly.

Optionally the pad comprises a circular pad, a double D pad or a bipolar pad.

In a further aspect a wireless power transfer pad magnetic structure is provided, comprising: a layer comprising a plurality of sections of magnetically permeable blocks, adjacent blocks in each section spaced apart by an inter-block spacing, wherein each adjacent sections are separated by an inter-section spacing greater than the inter-block spacing, wherein the inter-section spacing configured to reduce circulating flux in the layer.

Optionally the inter-section spacing is configured to be substantially perpendicular to the flux generated by the portion of the coil perpendicular to the plane of the magnetic structure.

In a further aspect a wireless power transfer pad magnetic structure is provided, comprising: a layer comprising a plurality of magnetically permeable blocks, adjacent blocks spaced apart by at least an inter-block spacing, Wherein at least two adjacent blocks are spaced apart by an gap greater than inter-block spacing, the gap configured to form a break in the path of the circulating flux in the layer, in use.

In a further aspect a wireless power transfer pad magnetic structure is provided, comprising: a layer comprising a plurality of magnetically permeable blocks configured as at least one ring, adjacent blocks spaced apart by at least an inter-block spacing, Wherein the ring is divided by at least one gap greater than inter-block spacing, the at least one gap configured to form a break in the circulating flux in the layer, in use.

Optionally the ring is a square ring. Optionally the ring is circular. Optionally there are two adjacent rings. Optionally the ring is divided in four locations. Optionally the divides are perpendicular to one another.

In a further aspect a wireless power transfer pad magnetic structure is provided, comprising: a layer comprising a plurality of magnetically permeable blocks configured as at least one ring, adjacent blocks spaced apart by at least an inter-block spacing, Wherein the ring is divided by at least one gap wider than inter-block spacing, the gap orientated radially from the centre of the ring.

In a further aspect a wireless power transfer pad magnetic structure comprising: a first surface configured to locate nearer a wireless power transfer coil than a second surface, wherein the relative magnetic permeability of the magnetic structure increases with distance from the first surface. This structure encourages the magnetic field away from the first surface of the structure encouraging use of more of the magnetic structure.

Optionally comprising a plurality of magnetically permeably layers, wherein a layer nearer the first surface has a smaller magnetic permeability than a layer further from the first surface. The layers may be physical layers of material, or the structure may have continuously varying parameters, with a layer being measured. Optionally the gap is at least two times wider than the inter-block spacing. Optionally the gap is at least four times wider than the inter-block spacing. Optionally the at least one gap divides the ring into sections.

Optionally the magnetic permeability of each layer increases with distance from the first surface.

Optionally the density of magnetically permeable material in a layer is configured to provide a selected magnetic permeability for that layer.

Optionally at least one of the layers comprises a plurality of blocks of magnetically permeable material.

Optionally the density of the magnetically permeable material in a layer is configured by a separation distance between the magnetically permeable blocks.

Optionally the density of the magnetically permeable material in a layer is configured by the size of the magnetically permeable blocks.

Optionally the density of the magnetically permeable material in a layer is configured by a separation distance between the magnetically permeable blocks.

Optionally the separation distance is an air gap. The air-gap refers to any gap of material with is not magnetically permeable, such as air or non-magnetic polymers and the like. Optionally the air gap comprises a support material.

Optionally the magnetically permeable blocks are provided in a matrix of support material. Optionally the support material is provided between layers. Optionally the matrix of supporting material provides a separation distance between the magnetically permeable blocks. Optionally the supporting material provides structural support to the magnetic structure. Optionally the supporting material is configured to absorb energy from mechanical force applied to the structure. Optionally the supporting material comprises a polymer material.

Optionally the magnetically permeable blocks are aligned with the magnetically permeable blocks in the adjacent layers so as to form columns of blocks. Alternatively the magnetically permeable blocks are mis-aligned with the magnetically permeable blocks in the adjacent layers so as to form staggered layers of blocks.

Optionally comprising a plurality of air-gap layers, the air-gap layers provided between the plurality of magnetically permeable layers.

Optionally one or more heat transfer channels are provided between adjacent magnetically permeable layers.

Optionally the heat transfer channels comprise heat transfer elements.

Optionally the plurality of magnetically permeably layers comprise magnetically permeable tape. Optionally the type of magnetically permeable material in the magnetically permeable layers is different.

Optionally mechanical support is provided at the first or second surface of the magnetic structure.

Optionally the first surface is configured to be immediately adjacent to the wireless power transfer coil.

Optionally the relative magnetic permeability increases proportional to the distance from the power transfer coil.

Optionally the relative magnetic permeability increases approximately exponentially with distance from the power transfer coil.

Optionally the magnetic structure comprises the power transfer coil. Optionally the power transfer coil is adjacent the first surface of the magnetic structure. Optionally energisation of the power transfer coil provides substantially uniform magnetic flux density in the magnetic structure.

Optionally the magnetically permeable material comprises ferrimagnetic material, such as ferrite.

Optionally the magnetically permeable material comprises particles of magnetically permeable material distributed in a substrate.

Optionally the magnetically permeable material comprises magnetically permeable nanocrystalline alloys.

Optionally the magnetically permeable material comprises ferrite.

In a further aspect there is provided a wireless power transfer pad magnetic structure comprising a plurality of wireless power transfer pad magnetic structures of any other aspect.

In a further aspect there is provided a wireless power transfer pad magnetic structure, comprising: a plurality of magnetically permeably blocks arranged in a plurality of layers; and one or more heat transfer elements provided between adjacent layers, wherein the heat transfer elements are configured to absorb or provide a pathway for transfer of heat from the magnetic structure.

Optionally the heat transfer elements are located at regions of the magnetic structure which have the greatest relative magnetic field in use.

Optionally the heat transfer elements or channels are located at regions of the magnetic structure where the most heat is generated in use.

In a further aspect there is provided a method of manufacturing a wireless power transfer pad magnetic structure having a first and second surface, the method comprising layering a plurality of magnetically permeable layers, wherein a layer nearer the first surface has a smaller magnetic permeability than a layer further from the first surface.

Optionally each layer comprises magnetically permeable tape.

Optionally the method comprises adjusting the magnetic permeability of each layer by adjusting an amount of magnetically permeable material in each layer.

Optionally the method comprises adjusting the type of magnetically permeable material in the layer.

Optionally each layer comprises a plurality of magnetically permeable blocks.

Optionally the magnetic permeability of each layer is adjusted by altering the number, size or arrangement of the magnetically permeable blocks in each layer. Optionally the magnetically permeable material is ferrite.

In a further aspect there is provided a method of preparing a magnetically permeable block for a wireless power transfer pad, the method comprising thermally pre-cracking the magnetically permeable block.

Optionally the magnetically permeable block is a ferrite block.

Optionally comprising the step of: encasing the magnetically permeable block in a matrix of support material. Optionally the magnetically permeable block is encased after the step of thermally pre-cracking. Optionally the magnetically permeable block is encased before the step of thermally pre-cracking. Encasing or potting the blocks reduces mess caused by cracking, or loss of material. It is possible to prestress the block without casing, or by casing then pre-stressing. In some cases the full pad may be created and encased and pre-stressed as a pad. Alternatively the pre-stressed blocks (either encases or not for pre-stressing) may be encased to form the pad after pre-stressing.

In a further aspect there is provided a method of preparing a wireless power transfer pad magnetic structure comprising: encasing a plurality of magnetically permeable blocks in a matrix of support material.

Optionally the step of thermally pre-cracking the magnetically permeable block comprises energizing the block.

Optionally the step of energizing the magnetically permeable block comprises generating a magnetic field on or near the block.

Optionally the magnetic field is generated by a wireless power transfer device.

Optionally the wireless power transfer device comprises a coil.

Optionally the step of thermally pre-cracking the magnetically permeable block comprises heating the magnetically permeable block into thermal runaway.

Optionally the step of thermally pre-cracking the magnetically permeable block comprises increasing a temperature in the blocks above 90 degrees centigrade.

Optionally the step of thermally pre-cracking the magnetically permeable block comprises the step of monitoring the temperature of the ferrite block.

Optionally further comprising the step of determining, by the monitored temperature, a thermal runaway in the magnetically permeable block.

Optionally further comprising the step of determining, by the monitored temperature, a reduction to a steady-state temperature in the magnetically permeable block after the thermal runaway.

Optionally the step of thermally pre-cracking the magnetically permeable block comprises energizing the ferrite for a period of time.

Optionally the period of time is between 30 minutes and 8 hours, preferably wherein the period of time is between 30 minutes and 2 hours. The period of time may be up to 0.5, 1, 2, 4, 6, 8 or 10 hours, or up to 20 house. The period of time may be between 1 and 10 hours, 2 and 4 hours.

In a further aspect there is provided a method of pre-cracking a magnetically permeable block, the method comprising the step of applying a magnetic field to the magnetically permeable block to induce an increased temperature in the block.

Optionally the magnetic field is applied by a wireless power transfer apparatus.

Optionally the magnetically permeable block is encased in a matrix of support material prior to the application of the magnetic field.

In a further aspect there is provided a method of forming a wireless power transfer pad magnetic structure, the method comprising encasing a plurality of thermally pre-stressed magnetically permeable blocks in a matrix of support material.

In a further aspect there is provided a method of forming a wireless power transfer pad magnetic structure, the method comprising encasing a plurality of magnetically permeable blocks in a matrix of support material and thermally pre-stressing the encased magnetically permeable blocks.

In another aspect a wireless power transfer pad magnetic structure is provided comprising: a plurality of magnetically permeable blocks arranged in a plurality of layers wherein a layer nearer to a wireless power transfer coil location has a smaller permeability than a coil further from the coil location.

In an embodiment the magnetically permeable blocks are ferrimagnetic blocks.

In an embodiment the magnetic permeability of each layer increases with distance from the layer nearest to the coil location.

In an embodiment the magnetic structure has a first side configured to be immediately adjacent to the power transfer coil.

In an embodiment the relative permeability increases proportional to the distance from the power transfer coil.

In an embodiment the magnetic structure includes the power transfer coil.

In an embodiment, the plurality of layers is configured such that energisation of the power transfer coil provides substantially uniform magnetic flux density in the magnetically permeable or ferrimagnetic blocks.

In an embodiment at least one of the layers comprises a block or tile of magnetically permeable or ferrimagnetic material. The material may comprise particles of magnetic material in a substrate or carrying matrix.

In an embodiment at least one of the layers comprises a plurality of blocks of magnetically permeable or ferrimagnetic material. The material may comprise ferrite.

In an embodiment the density of the magnetically permeable or ferrimagnetic material in a layer is configured to provide a selected magnetic permeability for that layer.

In an embodiment the density of a ferrimagnetic material, such as ferrite, in a layer is configured by a separation distance between ferrite blocks.

In an embodiment the density of ferrite in a layer is configured by a size of the or each magnetically permeable or ferrite block and/or a separation distance between the magnetically permeable or ferrite blocks. The separation distance may be referred to as an air gap.

In an embodiment, ferrite blocks are provided in a matrix of supporting material. The matrix of supporting material may provide air gaps.

In an embodiment the supporting material may provide structural or mechanical support to the magnetic structure.

In another embodiment the supporting material may absorb energy from mechanical forces applied to the structure.

In an embodiment the ferrite blocks may be configured to align blocks in the adjacent layers into columns of blocks. In this embodiment, the matrix material supporting the blocks may form columns of matrix material. The matrix material may also be provided between layers. In some embodiments the columns of matrix material are configured to mechanically support the columns of blocks.

In an embodiment ferrite blocks may be configured to be staggered between adjacent layers.

In an embodiment mechanical support may be provided at one or more outer surfaces of the magnetic structure.

In an embodiment the matrix material comprises a polymer material.

In an embodiment one or more heat transfer elements or channels are provided between adjacent layers. The heat transfer elements or channels are configured to absorb or provide a pathway for transfer of heat from the magnetic structure.

In an embodiment the heat transfer elements comprise heat pipes. In an embodiment the ferrite blocks comprise ferrite tape. In an embodiment ferrite blocks comprise ferrite tiles.

In another aspect a wireless power transfer pad magnetic structure is provided comprising: a plurality of magnetically permeable blocks arranged in a plurality of layers, and one or more heat transfer elements or channels provided between adjacent layers, the heat transfer elements or channels are configured to absorb or provide a pathway for transfer of heat from the magnetic structure.

In an embodiment the magnetically permeable blocks are ferrimagnetic blocks.

In an embodiment the heat transfer elements comprise heat pipes.

In an embodiment the heat transfer elements are located at regions of the magnetic structure which have the greatest relative magnetic field differences or disparities in use.

In an embodiment the heat transfer elements are located at regions of the magnetic structure where the most heat is generated in use.

In another aspect a method of providing a wireless power transfer pad magnetic structure is provided, comprising: configuring a plurality o magnetically permeable blocks to provide magnetic structure, pre-cracking the ferrite blocks, and encasing the correct magnetically permeable blocks in a matrix of support material. In an embodiment the magnetically permeable blocks are ferrite blocks.

In an embodiment the support material comprises a polymer material.

In another aspect a method of providing a wireless power transfer pad magnetic structure is provided, comprising: configuring a plurality of magnetically permeable blocks into a layer, wherein the blocks in the layer are divided into sections and the inter-block spacing between edges of adjacent blocks in each section is substantially the same, and the inter-block spacing is aligned between blocks in each section, and wherein there is an inter-section spacing between edges of adjacent sections, the inter-section spacing being greater than the inter-block spacing.

In an embodiment the magnetically permeable blocks are ferrite blocks.

In an embodiment the sections comprise four quadrants, and inter-quadrant spacing between edges of adjacent quadrants is greater than the inter-block spacing.

In an embodiment the layer has X and Y axes which divide the layer into the quadrants. The X and Y-axis. In an embodiment the quadrants are separated by the X and Y axes. In an embodiment the ferrite blocks comprise ferrite tiles.

In an embodiment the layer is substantially planar.

In an embodiment the letter comprises a hollow rectangle. In an embodiment the hollow rectangle comprises a hollow square.

In an embodiment the method further comprises configuring inter-quadrant spacing to reduce circulating magnetic flux.

In an embodiment the method further comprises configuring the inter-block spacing to improve coupling flux.

In an embodiment the method further comprises placing a wireless power transfer coil on one side of the layer.

In another aspect a method of providing a wireless power transfer pad magnetic structure is provided, comprising: simulating the magnetic field produced in use by a layer arrangement of substantially adjacent magnetically permeable blocks, detecting one or more regions of magnetic field strength which is greater than a threshold field strength, and adjusting the and air gap distribution between the magnetically permeable blocks to provide an adjusted layer arrangement in which the magnetic field strength is less than or equal to the threshold field strength. In an embodiment the magnetically permeable blocks are ferrite blocks.

In an embodiment adjusting the air gap distribution comprises adjusting the spacing between adjacent blocks.

In an embodiment providing the adjusted layer comprises aligning inter-block spaces, wherein an inter-block space comprises a space between adjacent blocks.

In an embodiment providing the adjusted layer comprises removing T joints or T intersections between adjacent blocks.

In an embodiment the method further comprises producing a magnetic structure according to the adjust layer arrangement.

In another aspect the invention provides a method of designing a wireless power transfer pad comprising consideration or modelling or testing of thermal performance.

In another aspect the invention provides a wireless power transfer pad constructed in accordance with the method of any one of the preceding statements.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Further aspects of the invention, which should be considered in all its novel aspects, will become apparent from the following description.

BRIEF DESCRIPTION OF THE DRAWINGS

A number of examples of the invention will now be described by way of example with reference to the drawings as follows.

DETAILED DESCRIPTION OF THE INVENTION

Figure 1:
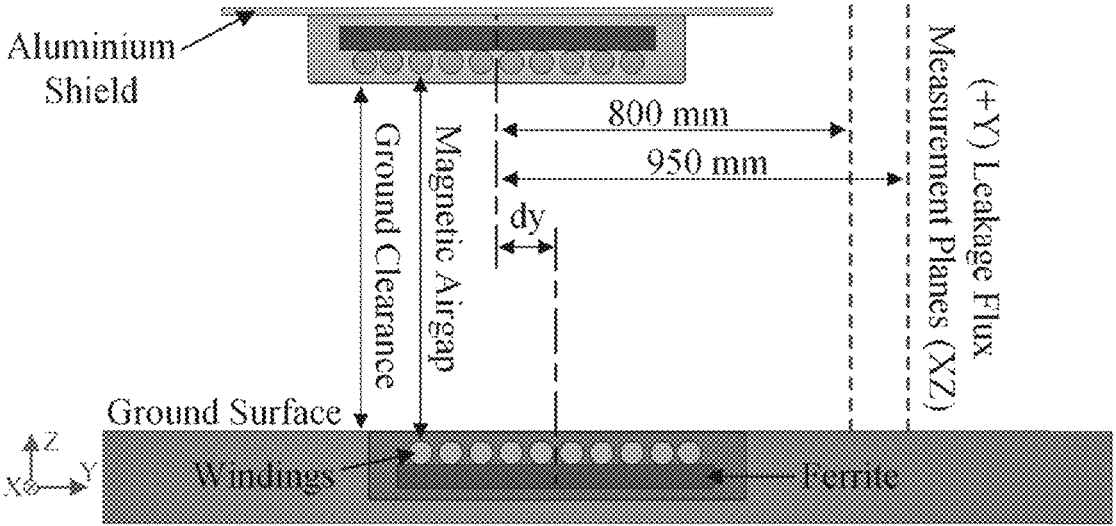
FIG. 1 shows a proposed flush-mounted 50 KW system alignment and leakage measurement planes. GA and VA pads are purple and blue respectively.

In some cases the thermal failure of magnetics can be predicted early in the finite element analysis (FEA) design stage by observing the magnetic field (B) distribution in ferrite structures of candidate high-power magnetic designs. It will be understood that the predictions and use of ferrite structures will also be applicable to wider range of magnetically permeable materials (or materials with a magnetic permeability substantially greater than air which has a relative permeability of 1). In some cases the relative permeability may be at least 100, at least 1000 or at least 2000. In some cases magnetic hotspots in high-power magnetic structures effect the design and/or structure of systems and we consider recommended structures and methods. In some cases both ferrimagnetic and/or ferromagnetic materials may be considered.

In particular, we first consider improvements to the thermal performance achievable through the arrangement of magnetically permeable tiles or magnetically permeable portions which form the ferrite structures. We secondly consider improvements the thermal stability of the magnetically permeable tiles or portions and methods to improve the thermal stability by pre-stressing the tiles or portions. Finally we consider creating a vertical profile of the magnetic permeability of the tiles or portions so as to reduce thermal effects at the surface by encouraging magnetic field flow further from the surface.

Proposed methods are developed at maximum misalignment conditions and implemented into a proposed 50 KW magnetic system. Although the methods are described in relation to a 50 KW magnetic system the skilled person will understand that they are applicable to at least other high-power magnetic systems (such as up to 100 KW, 200 kW or 1 MW), as well as low power systems where the same considerations are in place.

We contribute design techniques for high-power ferrite structures which improve thermal performance and avoid ferrite fracture due to thermal gradients caused by uneven magnetic flux distribution. In some cases these techniques reduce hotspots through appropriate sizing and distribution of inter-tile airgaps, and ferrite tile placement.

A power transfer experiment was performed using the proposed 50 KW magnetics to validate the leakage flux and the accuracy of the ANSYS and PLECS models of the protype system.

Methods of predicting and preventing thermal failure of high-power ferrite structures of inductive power transfer (IPT) pads used for wireless charging of electric vehicles (EVs) by improving their ferrite layouts is described. New ferrite structures, blocks or bars are also described for use in IPT pads.

A high-power IPT magnetic design suitable for wirelessly charging an EV at 50 KW using a heuristic approach is described. Experiments show that this new high-power magnetic pad design achieves reduced heating within the magnetic structure.

Recommendations are made for IPT pads and ferrite structures that avoid ferrite fracturing due to magnetic hotspots, which cause temperature differentials across ferrite tiles. Techniques to reduce loss by ensuring even magnetic flux distribution throughout the ferrite structure are also described. A method for reducing loss-inducing circulating flux within the ferrite structure without reducing coupling is also disclosed. Finally, recommendations are made regarding airgap distribution between ferrite tiles are also disclosed.

Power transfer was simulated in ANSYS and PLECS under misaligned conditions, and practically validated with 93.7% system efficiency. Thermal tests were performed under rated volt-amps and it has been found that the magnetics temperatures can be reduced from 168 to 67° C. after 30 minutes runtime using an improved magnetic layout (IPT pad including new ferrite blocks) of the present invention. Leakage fluxes were targeted and validated to be below 15 µT 950 mm from the centre of the vehicle side magnetics under rated power at worst-case misaligned conditions.

Proposed 50 kW System Alignment and Measurement Conditions

Chosen airgap distances, pad misalignment tolerances and leakage field measurements vary between research groups. The described 50 kW system uses sections of the low-power SAE J2954 recommended practice regarding ground assembly (GA) and vehicle assembly (VA) magnetics as a guide when defining these specifications. These are shown in FIG. 1, and Table

TABLE I

Proposed 50 kW System Design Constraints

| Parameter | Value | Parameter | Value |
|---|---|---|---|
| $V_1, V_2$ | 2 kV | dx | ±75 mm |
| $I_1, I_2$ | 200 A | dy | ±100 mm |
| $VA_1, VA_2$ | 400 kVA | dz | 160-210 mm |
| $L_1, L_2$ | 18.7 uH | $V_{batt}$ | 800 V |
| $Q_2$ | 10 | $B_{sat}$ | 100 mT |
| $k_{min}$ | 0.125 | Δk | 0.12 |

Extreme fast-charging wireless systems are unlikely to be installed on private EVs as it restricts use to dedicated fast-charging stations that are incompatible with domestic electricity supply. In some cases this allows the scope and/or design of the proposed 50 kW system to be directed towards EFVs which typically have a larger overall width and ground clearance than compact private use EVs.

Based on current trends in EFV design, a fast-charging system designed for a ground clearance of 160 to 210 mm covers a good range of EFV models. Allowing a pad misalignment of dx=±75 and dy=±100 mm is appropriate as this assumes automated vehicle alignment is not standard on all EFVs. Flush mounted GA (Ground assembly) pads are necessary in many applications, particularly for on-road parking. The VA pad is attached to the vehicle under a large aluminium shield. However, the fast-charging system may be applicable or design to fit a wider range of vehicles, including a greater ground clearance (up to 300 mm, up to 400 mm or up to 500 mm) or to allow for higher or lower pad misalignment. In other cases a relatively small ground clearance, such as 10 mm, or up to 20 mm, 50 mm or 100 mm may be used. For instance, to allow greater power transfer. In some cases the ground clearance may be between, or allow power transfer between, 10 and 500 mm, 20 and 500 mm or 50 and 500 mm.

For leakage field compliance, J2954 recommends fields be measured on detection planes located at the car doors. Existing research assumes this to be 800 mm from the center of the VA (Vehicle assembly) pad. However, this is overly conservative for high-power systems deployed on EFVs which require a 50 KW charger. Such vehicles are generally wider than 1900 mm. Therefore, in this work the design target was chosen to meet SAE limits at 950 mm from the VA center. In some cases different SAE limits may be used dependent on requirements, for example the distance from the VA centre may be up to 1000 mm, 1200 mm or 1500 mm.

Magnetic flux leakage limits (B_leakage) for high-power WCS are known. J2954 and ICNIRP 2010 recommend 27 µT as the public exposure limit, however this is lowered to 15 µT for persons with Cardiac Implantable Electronic Devices (CIEDs) [1]. The 50 KW system in this example aims to meet the 15 µT CIED limit at 950 mm from VA center under maximum misalignment and rated power transfer. In some cases different public exposure limits may be used.

50 KW Magnetics Design

Figure 2:
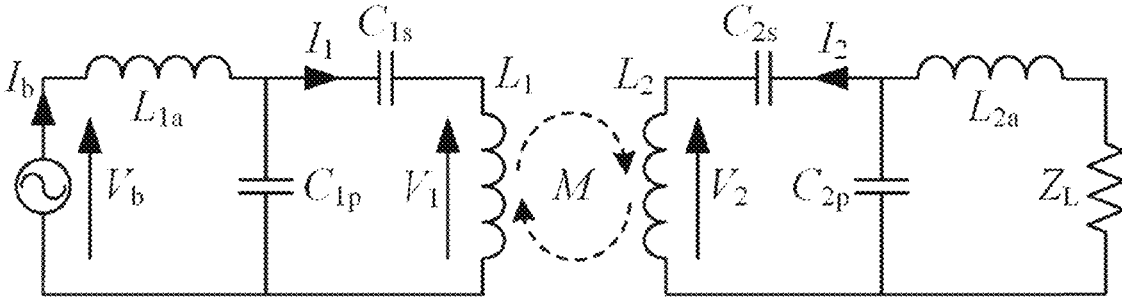
FIG. 2 shows a simplified diagram of LCL-LCL 50 KW IPT system

Initial design constraints are necessary to restrict the search area as a first step towards an optimal magnetics design. FIG. 2 shows a simplified electrical schematic of the LCL-LCL tuned 50 kW IPT system used in this work to demonstrate and evaluate the magnetics. Conventional IPT circuit theory was used to analyze the system and produce simplified equations (1) and (2).

By assuming an appreciable loaded quality factor of the secondary resonant circuit (Q2), the phase angle (θ) between 11 and 12 is 90°. Best coupling performance occurs with matched designs and operation with VA1=VA2 is optimal with respect to efficiency. Using this assumption, (2) is simplified to (3). This allows the required minimum coupling factor between the magnetics (kmin), to be calculated. By substituting (1) into (3), (4) is produced which relates maximum Q2 of the secondary and kmin.

$$P\_out = Q\_2 \, Su \tag{1}$$

$$P\_out = k\sqrt{(\ [VA]\_1 \ [VA]\_2\ )} \sin \theta \tag{2}$$

$$k\_min = P\_out/\ [VA]\_1, 2 \tag{3}$$

$$Q\_(2(max)) = 1/k\_min \tag{4}$$

50 KW System Design Constraints

Table I displays the initial design constraints placed on the magnetics design. While SAE J2954 does not govern charging systems rated above 10 KW, it is useful as a guideline regarding pad misalignments, leakage flux requirements such as the maximum values set by ICNIRP 2010, and how leakage flux is measured relative to the EV.

Some initial constraints were placed on the electrical characteristics of the magnetics. Ideal limits of 2 KV at the coil terminals, a maximum coil current of 200 A, and a maximum Q2 of 10 were decided. The voltage limit minimizes the risk of corona discharge within the winding and terminals, while the current limit ensures a practical Litz wire diameter and operating temperature. Q2<10 reduces the system's sensitivity to component tolerances. In some cases these constraints may not apply.

A matched rating of 400 kVA combined with (3) produces a required kmin of 0.125, and (4) shows a subsequent Q2 below 10 if kmin is achieved. Saturation limits of the ferrite (Bsat) were taken from the supplied datasheet.

As seen in FIG. 2, the input H-bridge (modelled as an AC voltage source) produces a square wave bipolar waveform (Vb) When connected to an LCL network the bridge current (Ib) follows a triangular waveform as described in herein. The system was operated at a 180° conduction angle and designed so the LCL network appears as a slightly inductive load on the H-bridge. This enabled zero-volt switching (ZVS) in the H-bridge and reduced switching losses. Alternative control methods may be used or designed for within the present disclosure.

Achieving ZVS for all pad alignment positions without active tuning is challenging due to changes in reflected impedance from the secondary coil, which changes the phase angle between Vb and Ib. Therefore, it is ideal to minimize the difference (Ak) between kmin and kmax.

50 KW Magnetics Design Process and Final Dimensions

Figure 3A:
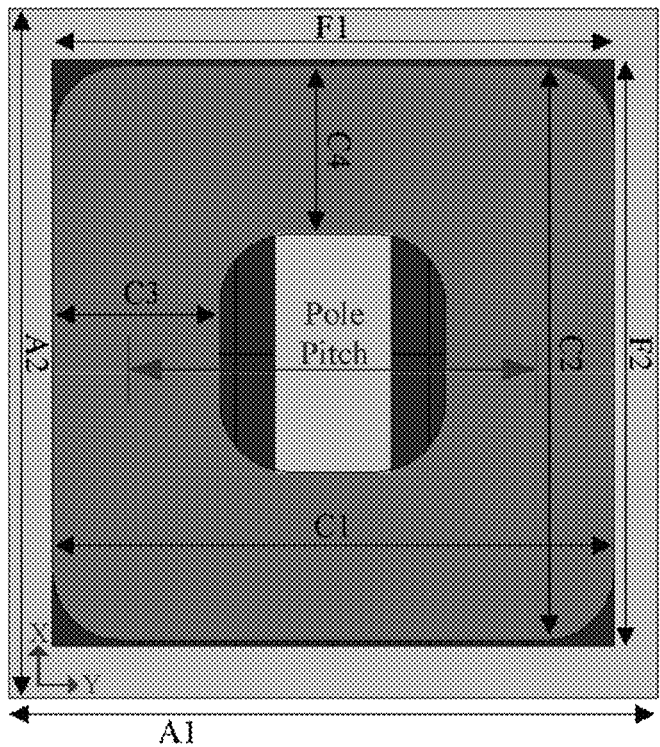
FIG. 3 shows a) Top view and (b) side view of prototype 50 KW magnetics. In (b), GA and VA dimensions are both shown (GA/VA) in mm.
Figure 4:
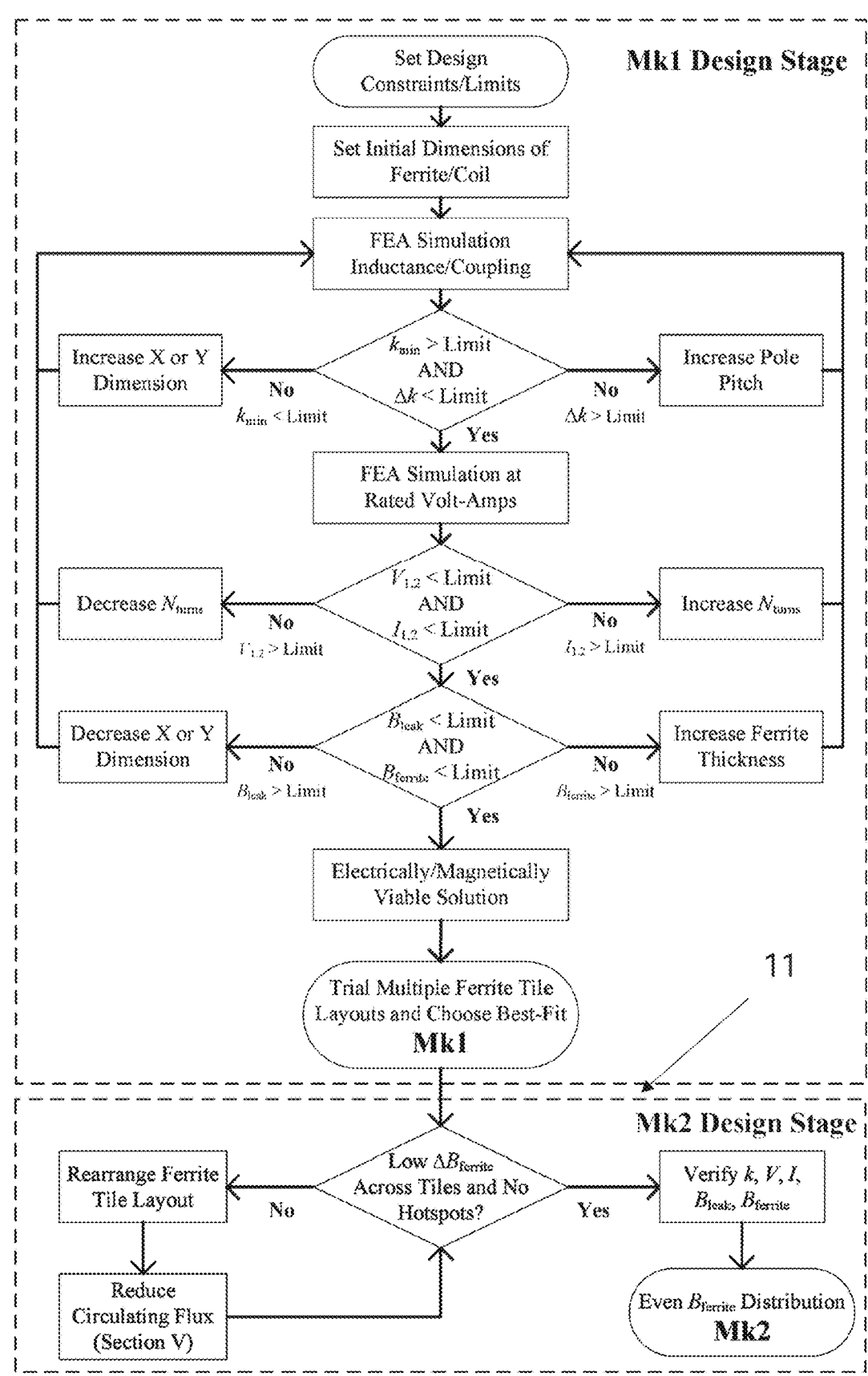
FIG. 4 shows a 50-kW magnetics design process flow chart.

The key dimensions of the magnetics that were modified in the design process are shown in FIG. 3(a). These include coil winding measurements: maximum coil width C1, maximum coil height C2, minimum coil width C3 (of one portion of coil), minimum coil height C4 (of one portion of coil), coil thickness. These also include ferrite (or permeable member) measurements: ferrite width F1, ferrite height F2, ferrite thickness. These also include backplate measurements, of height A2, and width A1. Spacing between each of the layers and, in addition, the front cover is also dimensioned. Although the dimensions have been described as height and width it would be understood these simply refer to first and second dimensions and may vary dependent on the relative orientation of the pad. The proposed heuristic design approach that was used to develop the 50 KW magnetics is shown in FIG. 4.

The design process began with a matched system using a circular pad (CP) topology given it is preferred for GA magnetics in standards, and naturally has low leakage despite lower tolerance to misalignment compared to a DDP. Although examples are shown for a circular pad the resulting improvements will There are no set limits when sizing the magnetics. However, a practical system needs to minimize the sizes of the pads, in particular the VA. Initial outer coil/ferrite dimensions of 600×600 mm were chosen, and the coupling behaviour was observed.

Under maximum dx and dy misalignment the GA is closer to leakage detection planes normal to the Y axis compared to those normal to the X axis. Therefore, increasing X axis dimensions of the coil and ferrite, C2 & F2 (FIG. 3(a)), to increase coupling was preferred. This increased kmin with minimal increase to maximum leakage flux.

Decreasing Δk was achieved by increasing the pole pitch, defined as the distance between the centre of each side of the windings (shown in FIG. 3(a)). This was achieved by fixing C1 & C2 while lowering C3 & C4. This method is a trade-off between a decrease in Δk, and tightly packed coil windings with higher localised flux within the ferrite (Bferrite).

Once acceptable magnetic properties were achieved, the FEA simulation was run with rated volt-amps in each pad. Coil voltage and currents were maintained under their respective limits by balancing the number of winding turns (Nturns). Based on the current limit of 200 A, 4800×0.1 mm Litz wire was selected for the winding, and was made bi-filar resulting in a conservative rating of 300 A. This ensures the coil is operating at two-thirds its rating, thereby minimising additional thermal problems in the copper windings. In cases with alternative dimensions and/or limitations the wire and/or electrical properties may change.

Leakage flux was managed by reshaping the outer dimensions to balance distribution between each detection plane. Initially 5 mm thick N95 ferrite was proposed to minimise pad thickness, however B_ferrite was close to saturation at rated volt-amps. Commercially available 10 mm thick 125× 100 mm ferrite tiles were chosen to conservatively keep the average flux density below 70% of its saturation point. Although FIG. 3 shows a unitary ferrite it will be seen by those skilled in the art that the ferrite elements may comprise blocks or tiles. The shape of the tiles may also vary from that illustrated.

The abovementioned design process leads to the end of the section 11 of the flowchart in FIG. 4. This process was repeated to produce several electrically and magnetically sound designs and the best was selected for prototyping and labelled Mk1. The Mk1 was chosen as its ferrite layout required the least machined tiles (three non-standard sizes), which is attractive from a production point of view. The design process was further iterated to slightly reduce the size of the VA.

Additional design steps (1 in FIG. 4) are proposed by this work to reduce localised B hotspots and ensure even B distribution within the ferrite structure. This produced a second design, labelled Mk2. These additional steps included aligning ferrite inter-tile airgaps and reducing circulating flux within the ferrite structure (discussed below). These improvements came at the expense of using four non-standard size ferrite tiles, one more compared to the Mk1.

Figure 5A:
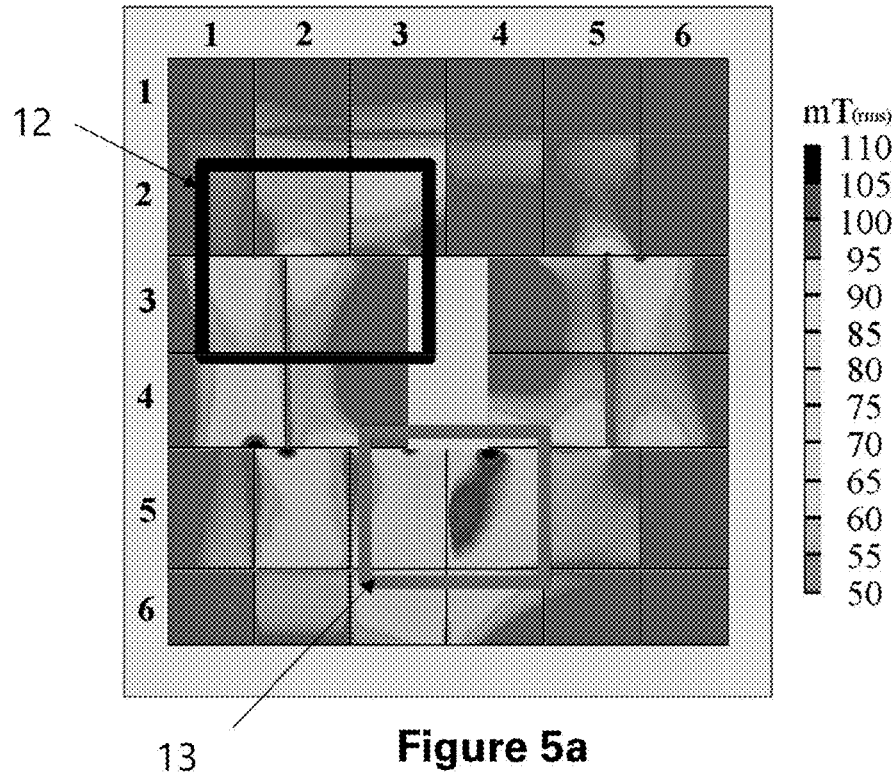
FIG. 5 shows (a) Mk1 and (b) Mk2 50 kW GA prototype FEA |B| contour plots.
Figure 5B:
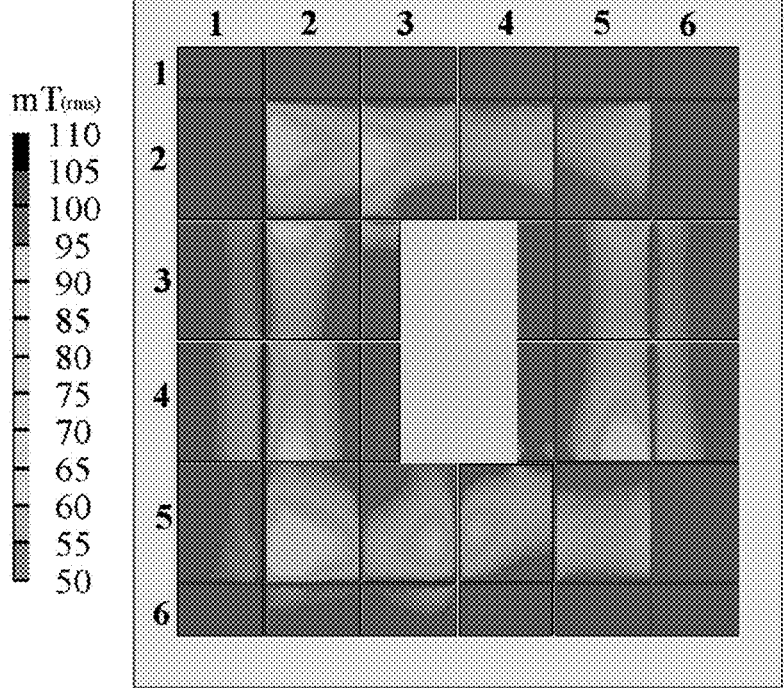

Both the Mk1 & Mk2 designs, shown in FIG. 5, can transfer 50 KW and comply with the specifications in Table I. Overall dimensions are identical between the two designs and are presented in Table II with reference to FIG. 3(a). The addition steps shown in FIG. 4 result in a noticeable reduction in peak fields around the coil, see in particle areas (12) and (13) of FIG. 5a.

Figure 3B:
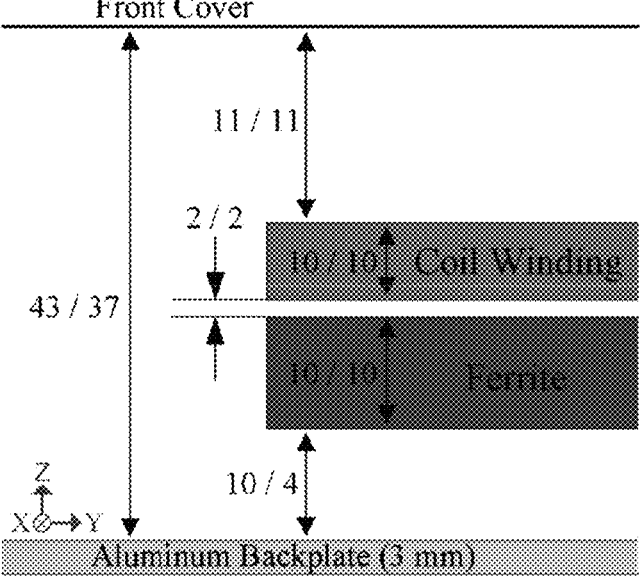

Distances between ferrite, windings and the aluminium backing plate are shown in FIG. 3(b), where the vertical line separates GA and VA measurements. Again, these may be varied for different design priorities. These values were chosen based on standardised pad designs and planned future work to include an active air-cooling system. Coupling and self-inductance values for the Mk2 are shown in Table VI.

Effects of Magnetic Hotspots in High-Power Ferrite Structures

Herein we explore the impact of ferrite hotspots and their effects in high-power IPT magnetics. This section sets out experiments into their effects by comparing the two 50 KW magnetics designs (Mk1 & Mk2) presented through simulation and experimental results. The objective was to show the effectiveness of preventing thermal failure of the magnetic structure by ensuring even B distribution and minimizing magnetic hotspots during the design process.

Within a given ferrite structure of an IPT (or resonant wireless power transfer) pad, a "hotspot" refers to a localized concentration of B, usually confined to a single ferrite tile which is significantly higher in magnitude than the average B of the surrounding ferrite structure. The presence of a hotspot correlates to a high magnetic flux density differential (ΔB) across a ferrite tile. This may be determined from regions of magnetic flux that exceed a threshold. The threshold might be an absolute value, but in the embodiment described is relative to another region, the region being across one tile or multiple tiles. Hotspots can be caused by suboptimal ferrite tile placement and asymmetric airgaps between ferrite tiles caused by mechanical tolerances in the pad assembly process.

When ferrite is not forced to operate at high temperatures or near its saturation point, hotspots can be safely ignored. However, in high-power IPT systems, magnetic materials are often pushed to their limits to maximize power density and such ferrite hotspots can no longer be neglected.

Further designs of ferrite structures that may be used in an IPT pad that provide for an even B distribution and thus minimize hotspots are described with reference to FIGS. 19 to 27.

Ferrite Fracturing Due to Temperature Differentials Caused by Magnetic Hotspots

The Mk1 & Mk2 designs described in Section III were simulated, built, and tested (FIG. 5). The average magnetic flux density (B_avg) within the ferrite structure does not exceed saturation at 100 mT rms in either design, except for localized hotspots in Mk1.

Initially, it was unclear if small B hotspots shown during FEA simulation of the Mk1 prototype were true depictions of flux crowding within the ferrite structure, and whether they would be significant in terms of a thermal perspective. Table III shows B_avg simulated in each ferrite tile, and the maximum temperature recorded in each tile after 30 minutes during Mk1 & Mk2 prototype testing. A FLIR T540 thermal camera was used, and the operating conditions for this experiment are discussed.

TABLE III

| Average Flux Density (mT) and Maximum Temperature (° C.) ($B_{avg}$ \| $T_{max}$) for Mk1 & Mk2 GA Ferrite Tiles | | | | | |
|---|---|---|---|---|---|
| 1 | 2 | 3 | 4 | 5 | 6 |
| Mk1 | | | | | |
| 43\|44 | 46\|49 | 48\|52 | 47\|49 | 46\|53 | 41\|43 |
| 53\|50 | 60\|63 | 63\|62 | 52\|55 | 57\|65 | 47\|54 |
| 61\|64 | 54\|61 | N/A | N/A | 49\|56 | 61\|81 |
| 64\|66 | 52\|72 | N/A | N/A | 60\|89 | 58\|76 |
| 51\|62 | 68\|101 | 75\|174 | 88\|167 | 59\|126 | 59\|60 |
| 49\|49 | 60\|55 | 71\|80 | 64\|82 | 45\|78 | 37\|41 |
| Mk2 | | | | | |
| 39\|43 | 45\|49 | 42\|48 | 41\|49 | 42\|50 | 39\|41 |
| 45\|48 | 59\|64 | 58\|56 | 55\|56 | 56\|56 | 47\|54 |
| 48\|53 | 55\|69 | N/A | N/A | 56\|51 | 50\|50 |
| 49\|53 | 57\|74 | N/A | N/A | 59\|70 | 51\|64 |
| 48\|47 | 62\|58 | 58\|61 | 59\|57 | 58\|62 | 45\|51 |
| 43\|42 | 51\|51 | 52\|53 | 45\|47 | 40\|44 | 34\|41 |

Table III is set by rows and columns with respect to FIG. 5. The B_avg for the whole ferrite structure is 56 and 50 mT, with standard deviations between tiles of 11 and 7 mT for the Mk1 & Mk2 respectively. Although the relationship between B_avg and ferrite temperature is non-linear, the results correlate high B_avg with high thermal loss showing a clear improvement in the Mk2.

Table IV shows the flux density and temperature gradients (ΔB, ΔT) over the Mk1 & Mk2 ferrite structures. Mk2 shows a 45 and 70% reduction in average ΔB and ΔT respectively, and the peak ΔB and ΔT are reduced by 68 and 73%. These results support the proposed hypothesis that reducing ΔB during the FEA design process effectively reduces ΔT in the ferrite tiles of the prototype.

TABLE IV

| Flux Density (mT) and Temperature (° C.) Gradients (ΔB \| ΔT) Per Ferrite Tile for Mk1 & Mk2 GA Designs | | |
|---|---|---|
| | Average Per Tile | Peak Tile |
| Mk1 | (33 \| 23) | (59 \| 79) |
| Mk2 | (18 \| 7) | (19 \| 21) |

Thermal images of the Mk1 & Mk2 prototypes are shown in FIG. 6. These show good agreement with their respective simulated |B| contour plots shown in FIG. 5. This relationship between B hotspots 1, 2, 3, 4, 5, 6 and localized regions of high temperature within the ferrite appears to be relevant to both small and large hotspots. This can be seen by comparing the Mk1 |B| contour and thermal images. Hotspots predicted by FEA simulation no larger than a few millimeters appear in FIG. 6(a). This also indicates the

Figure 7A:
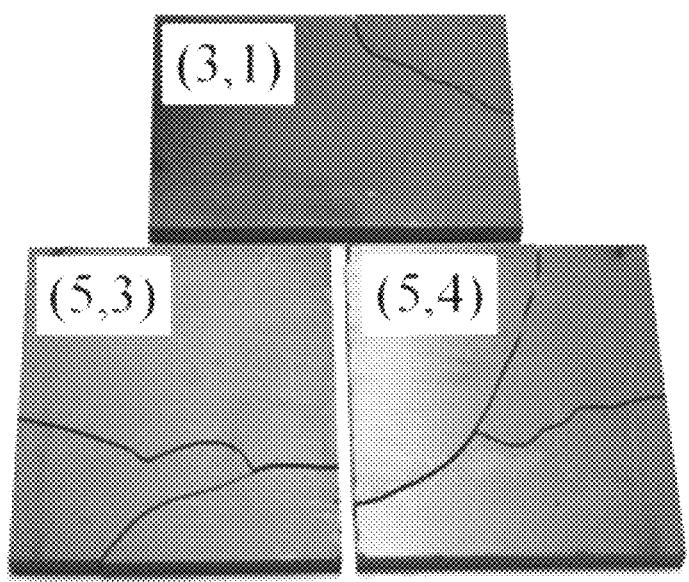
FIG. 7 shows Mk1 prototype ferrites (a) labelled with respect to FIG. 5 tile grid numbering and (b) shows a closeup of tile (5,4).
Figure 7B:
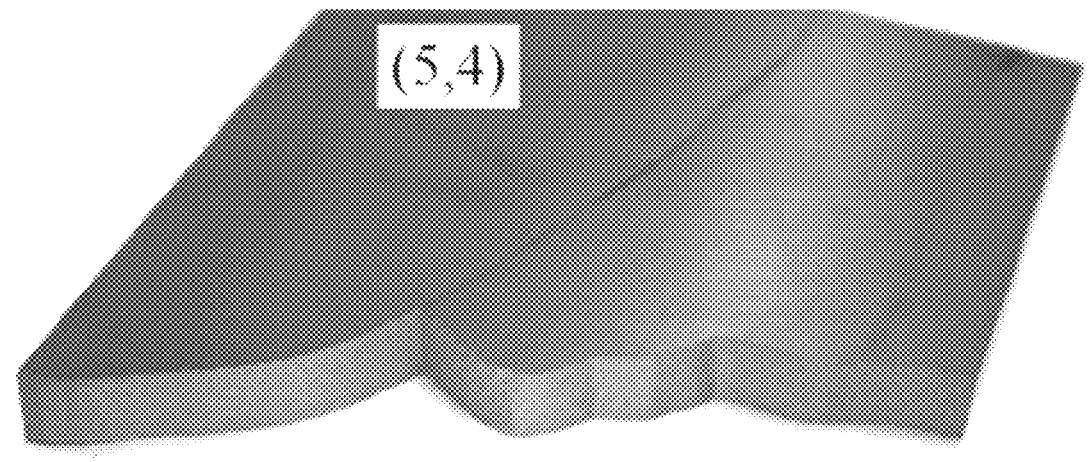

18 thermal conductivity of ferrite is not sufficient to evenly distribute heat generated by localized B hotspots in the Mk1 design. Sufficient heating may cause cracking of the ferrites as shown in FIGS. 7(a) and 7 (b). The ferrites are labelled with the grid of FIG. 5a to show the cracks align to the hotspots.

Hotspots at Airgap Intersections of Adjacent Ferrite Tiles

In regions where T intersections occur hotspots may be created. For example FIG. 5a shows a region 12, where 4 ferrite tiles, two verticals ((2,1) & (2,2)) and two horizontals ((3,1) & (3,2)), meet within the Mk1 50 KW GA prototype. Two T-intersections form where the tiles meet, and the B vector plot and |B| contour plot are overlaid on a closeup of this region in FIG. 8.

Figure 8:
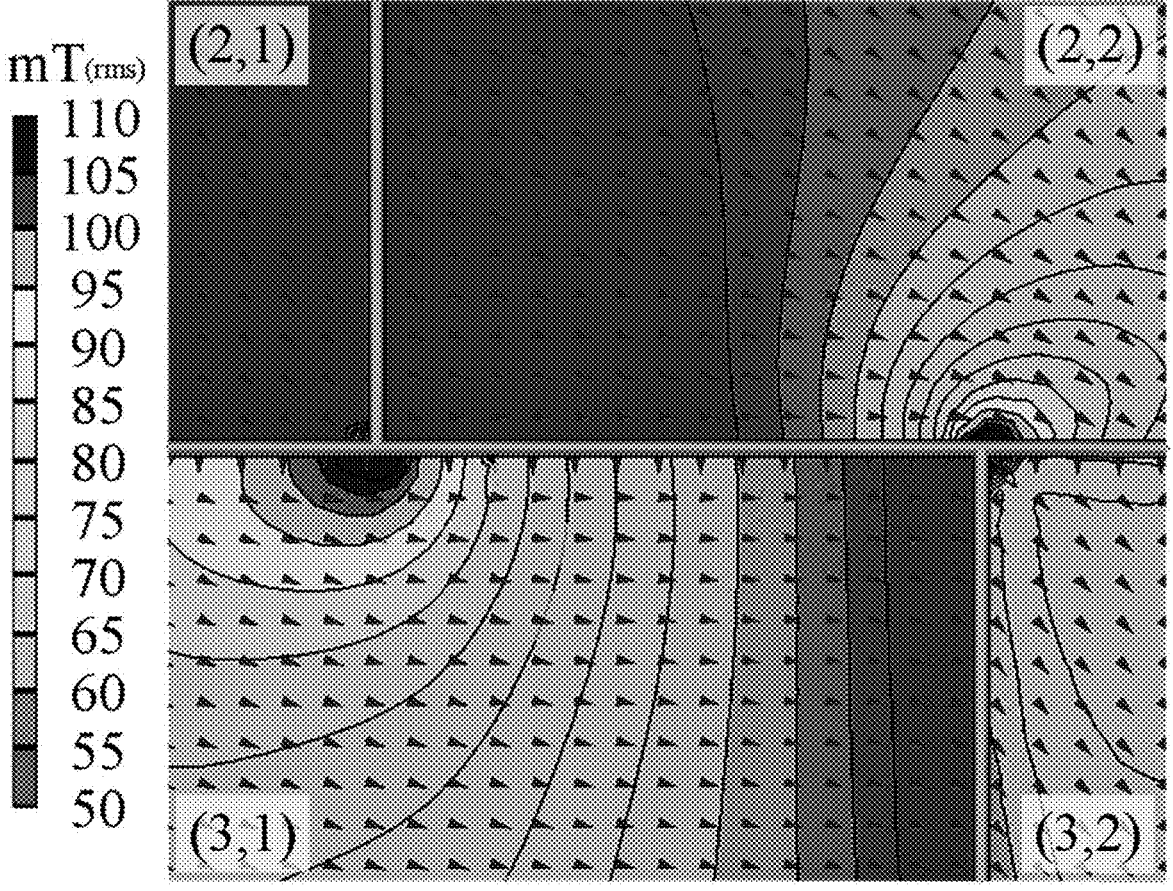
FIG. 8 shows a |B| contour plot from a region of the top left region of Mk1 prototype FEA with overlaid B vector plot.

The vector arrows in FIG. 8 show diagonal B (caused by the winding radius), in tile (2,1) concentrated in its lower right corner. This meets the horizontal flux in central tile (3,1) at a T-intersection causing a hotspot. In the Mk2 design, all the airgaps are aligned which removes any T-intersections and introduces an extra airgap which increases the reluctance of the central flux path. This reduces diagonal flux magnitude through the central ferrites. Therefore, the flux crowding observed in the Mk1 is not present in the Mk2 ferrite layout.

Hotspots appearing where ferrite tiles meet does not exclusively occur with T-intersections as seen in the Mk1 prototype. Assembly tolerances can cause hotspots within any ferrite structure which could potentially lead to fractures.

Figure 9:
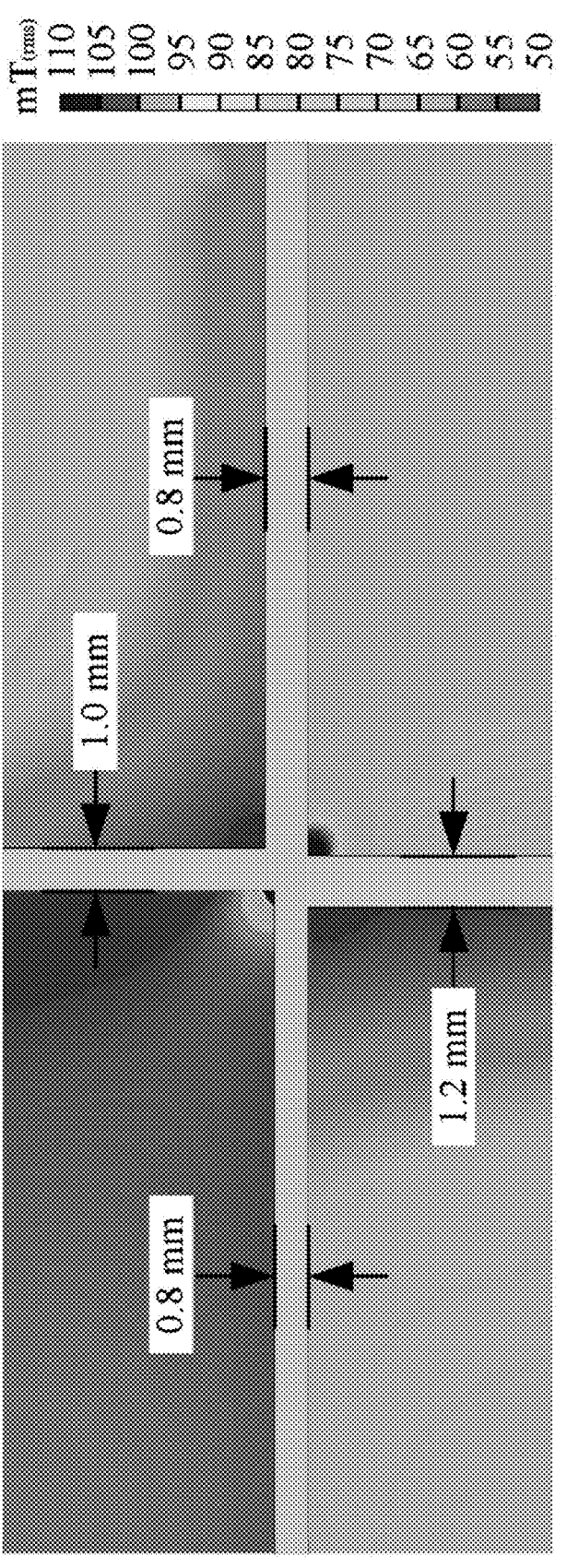
FIG. 9 shows a FEA |B| contour plot of ferrite tiles located under top left winding radius of Mk2 GA. Each tile is offset from its ideal position by 0.2 mm.

FIG. 9 shows four ferrite tiles ideally separated by 1 mm airgaps meeting in the path of diagonal flux located under a winding radius in the Mk2 prototype. The ferrites have been offset from their ideal positions by 0.2 mm to emulate assembly tolerances during pad construction. Note the hotspots appearing at the corners of the top left and bottom right tiles. While small, it has been shown by testing Mk1 they could cause fractures. Gaps or spaces that are too small (for example less than 0.5 mm, less than 0.2 mm) often leads to sensitivity to assembly tolerances.

Analysis of Circulating Flux and Air Gapping in High-Power Ferrite Structures

Proof of Circulating Magnetic Flux

Magnetic circuits can be described using equation (6). Where voltage, current and resistance are analogous to magneto-motive force, magnetic flux, and reluctance respectively. Equation (6) can be rearranged into equation (7) to describe the flux in the circuit, whereas equation (8) describes the reluctance of the magnetic circuit as a function of the effective magnetic path length l_e, effective area A_e and relative permeability $\mathcal{R}$_e of the medium the flux passes through.

$$\mathcal{F} = \Phi \mathcal{R} \tag{6}$$

$$\Phi = NI/\mathcal{R} \tag{7}$$

$$\mathcal{R}\_e = l\_e/(A\_e \mu\_0 \mu\_r) \tag{8}$$

$$\Phi\_1 = NI/(\mathcal{R}\_0 + \mathcal{R}\_f) \tag{9}$$

$$\Phi\_2 = NI/\mathcal{R}\_f \tag{10}$$

Figure 10A:
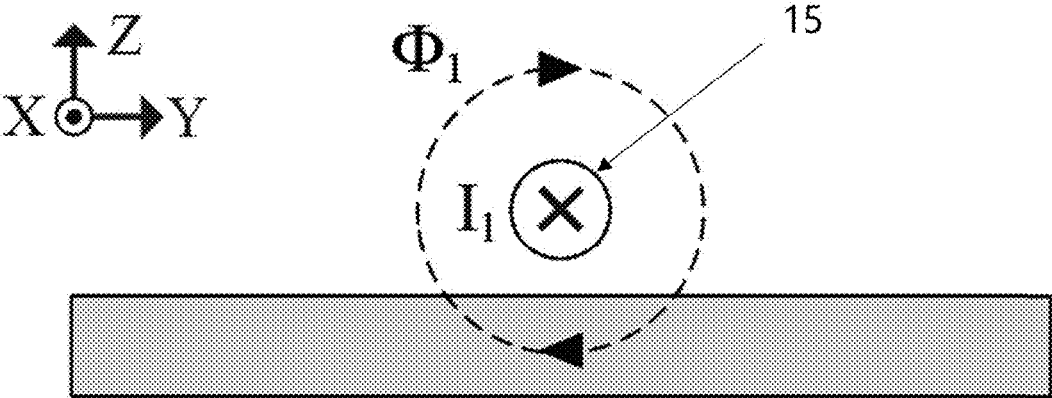
FIG. 10 shows a) current carrying conductor running parallel to face of ferrite tile. (b) the conductor passing through and enclosed by ferrite tile.
Figure 10B:
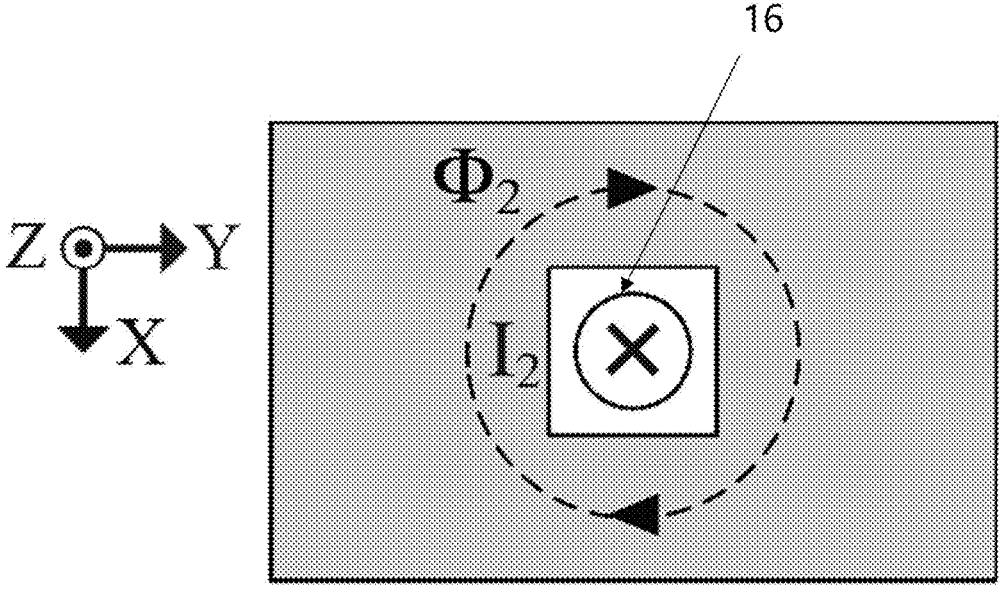

FIG. 10 demonstrates two different interactions between a current carrying conductor and a ferrite tile. FIG. 10(a) shows a conductor (15 on FIG. 10(a)) parallel to a ferrite tile in free space, while FIG. 10(b) shows a vertical conductor (16 on FIG. 10(*b*)) normal to and traveling through the center of the same tile carrying the same current.

In FIG. 10(*a*), it is impossible to form a closed flux contour around the conductor which does not travel through the region of air between the conductor and the ferrite. In FIG. 10(*b*), closed flux contours form around the conductor which remain only within the ferrite. This forms two equations, (9) and (10), where $\Phi\_2$ is much greater than $\Phi\_1$. This is because the reluctance of the contour section in FIG. 10(*a*) which passes through air $\mathcal{R}\_0$, is thousands of times larger than $\mathcal{R}\_f$, the reluctance seen by the contour in FIG. 10(*b*). This is because the relative permeability of ferrite, $\mu\_r$, is 103 times higher than air whose $\mu\_r$ can be approximated as 1.

The above comparison of $\Phi\_1$ and $\Phi\_2$ approximates that $l\_e$ is the same in both cases, and the difference between $A\_e$ of the flux path in air and in ferrite is dominated by $\mu\_r$ in equation (8).

Effect of Coil Winding Exit Through Ferrite Structure

Figure 11A:
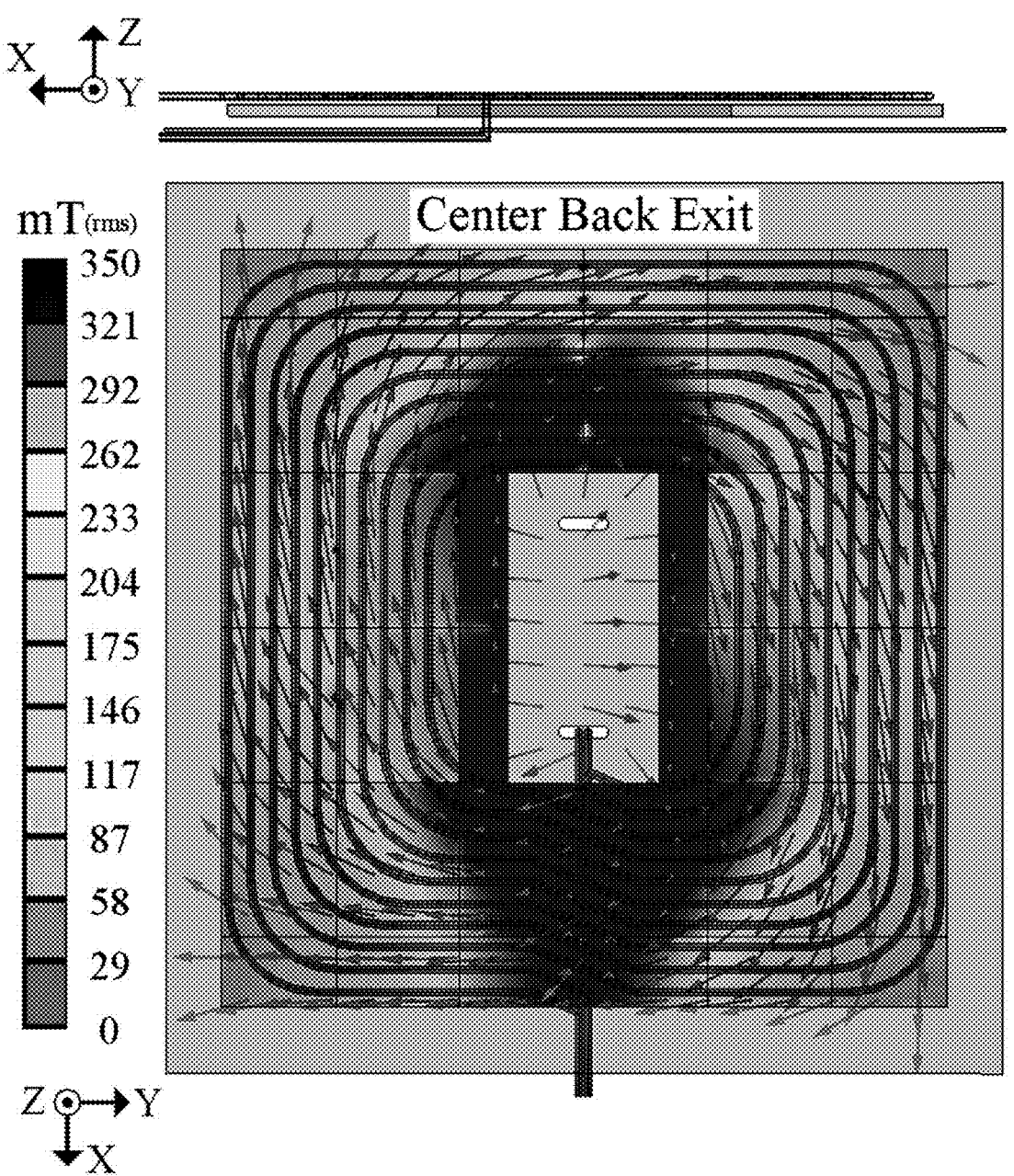
FIG. 11 shows Top and side view of 50 kW Mk2 GA with B vector plots when (a) coil exits through the back of the pad and (b) Coil exits through the front of the pad.
Figure 11B:
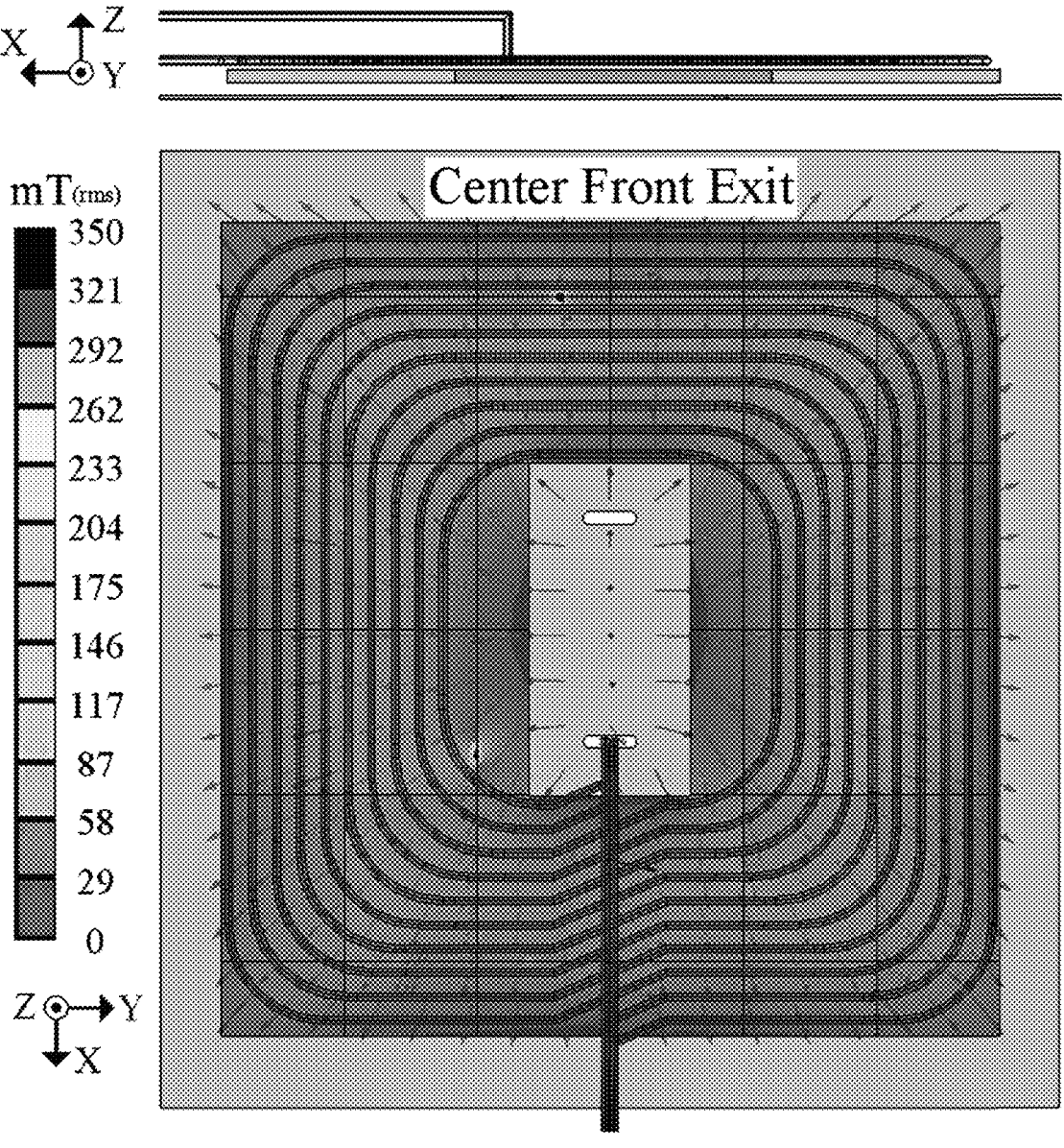

The preceding circulating flux proof is supported by two ANSYS simulations shown in FIG. 11. Both simulations use the 50 kW Mk2 pad design presented in this paper, and both show a B vector plot within the ferrite with 200 A rated current in each winding. The simulations differ in how the coil winding exits the pad, but both have identical geometry otherwise and use a 0.1 mm airgap between adjacent ferrites.

In FIG. 11(*a*), the FEA simulation shows a high magnitude B vector field that exhibits a curl centered around the winding as it exits through the ferrite structure and the back of the pad. However, when the coil exits through the front of the pad in FIG. 11(*b*), the B vector field does not exhibit any visible curl and the B in the ferrite is on average 10 times lower in magnitude than FIG. 11(*a*). Therefore it is advantageous to mitigate circulating magnetic flux without coupling reduction by changing the coil exit from the pad. Having the coil exit through the front of the pad in a 50 KW system is usually not practical due to high voltages and currents near the ground surface. Therefore, a solution that allows rear cable exits without affecting coupling was investigated.

FEA simulations were created that compare two methods of reducing circulating flux in the ferrite structure of an IPT pad and results are compared in FIG. 12. A ferrite structure which simply uses airgaps is shown in 12(*b*) whereas the method of 12(*c*) maintains a fixed distributed airgap at 0.1, 0.5 or 1.0 mm, and introduces increasingly large airgaps along the central X and Y axis of the ferrite structure. As shown in FIG. 12(*c*) The X and Y axes define quadrants 7 in the layer of ferrite tiles or blocks that together provide the magnetic structure. The X and Y axes pass through the centre of the structure perpendicular to one another. As shown in FIG. 12 they are vertically and horizontally aligned. The inter-quadrant spacing 8 is greater than the inter-tile spacing 9 for the tiles within each quadrant. Although the structure is shown in the form of a hollow square, it may take other forms. In some cases the structure has an outer perimeter and an inner perimeter. The inner perimeter may be configured to surround or locate near a pole of a wireless transfer power coil. The inner perimeter therefore surrounds or encloses an inner cut-out or hole of the magnetic structure. The circulating flux may circulate around the inner cut-out or hole of the magnetic structure. For more complex pads there may be multiple inner cut-outs or holes and the circulating flux may be around any one or more of the hols or inner cut-outs.

The FEA models shown in FIG. 12(*a*) demonstrate the distributed airgap FIG. 12(*b*), and the X and Y axis lumped airgap model FIG. 12(*c*). The results show an average B reduction within the ferrite volume for both methods of air gapping. However, the X and Y lumped airgap method shows a slight increase in coupling factor compared to the distributed airgap method which shows a gradual decrease in coupling as the airgap widths are increased.

These results are explained by observing the B vector fields in FIG. 11 which show the two extremes. Circulating flux within the ferrite core is reduced significantly as the X and Y axis lumped airgap size increases (FIG. 12(*c*)). However, the magnetic flux path that couples the primary and secondary winding is largely unaffected. This is contrasted with the distributed airgap method which also reduces circulating flux, but also increases the reluctance of the flux path that couples the GA and VA windings.

In this disclosure the evaluation focused on worst-case volt-amps by operating at maximum misalignment. For completeness, the simulations were also repeated in the aligned position and the same trends shown in FIG. 12(*a*) were observed.

For the Mk2 ferrite layout, a distributed airgap of 1 mm was chosen with 4 mm airgaps running along the X and Y axis to minimize the amount of circulating flux with a minimal impact on coupling. The results are presented using the solid 20 and dashed green 21 lines in FIG. 12(*a*) representing the XY Airgap k (1.0 mm) and the XY Airgap B (1.0 mm), respectively. Reducing circulating flux is critical for high-power systems as it increases loss within the ferrite structure without contributing to power transfer.

50 KW Magnetics Experimental Results

Figure 15:
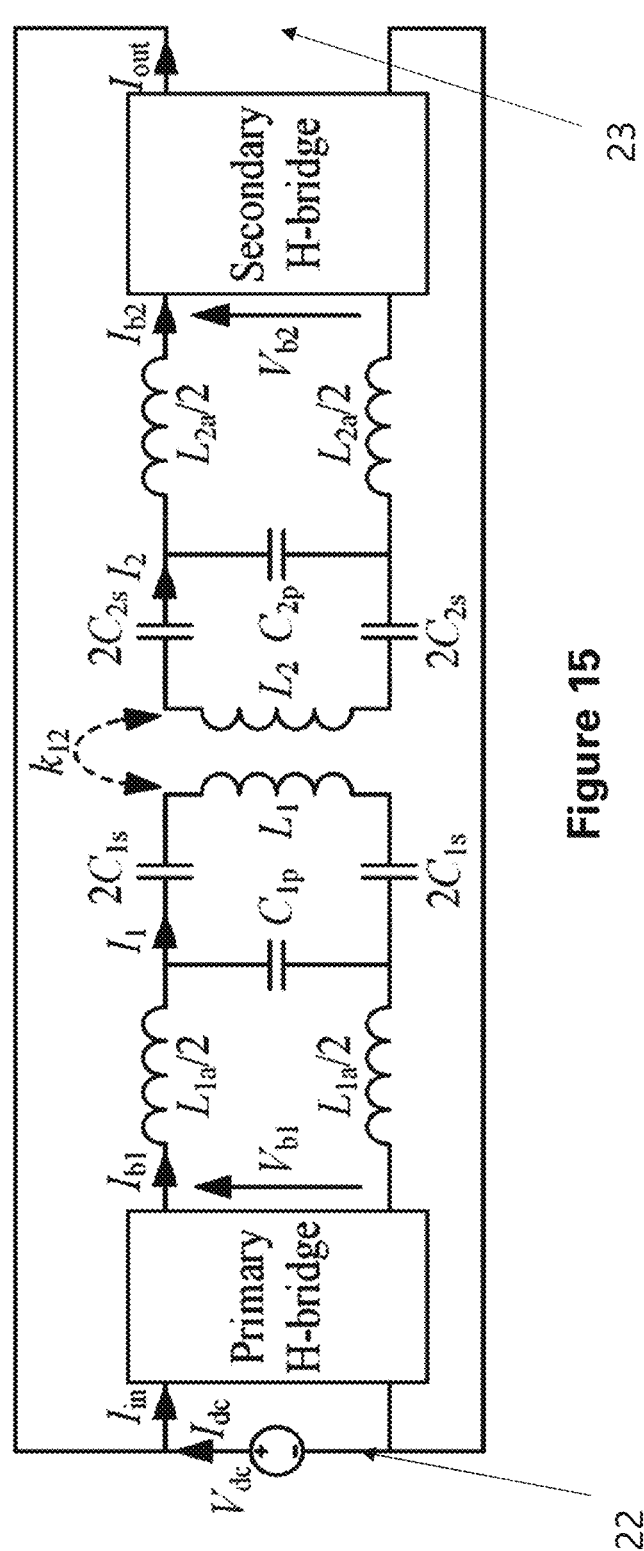
FIG. 15 shows a circuit diagram of 50 KW prototype system experiment setup and PLECS model.

A 50 KW IPT system was built to test the magnetic and thermal limitations of high-power density IPT magnetics. Thermal testing was performed at rated volt-amps on both the Mk1 & Mk2 GAs individually. To test leakage fields a 36 kW power transfer test was performed using the Mk2 GA. Ideally this would have been undertaken at 50 KW however the cooling system planned for the power electronic switches in the inverters was unavailable, as such the volt-amps in the electronics had to be limited. 50 KW results are extrapolated from the 36 KW experiment and discussed below. FIG. 15 shows the block diagram of the LCL tuned 50 kW prototype system and PLECS model.

Thermal Testing of Mk1 & Mk2 GA

For thermal testing the GA prototypes, the VA pad and housing assembly were removed, and a thermal camera was installed above the GA to monitor the pad temperature. The thermal camera identifies heating caused by high magnetic fields in the ferrites. Both Mk1 & Mk2 GA pads were individually tested and energized at rated current of 205 A that would impart 50 kW of power transfer for 30 minutes.

Figure 16:
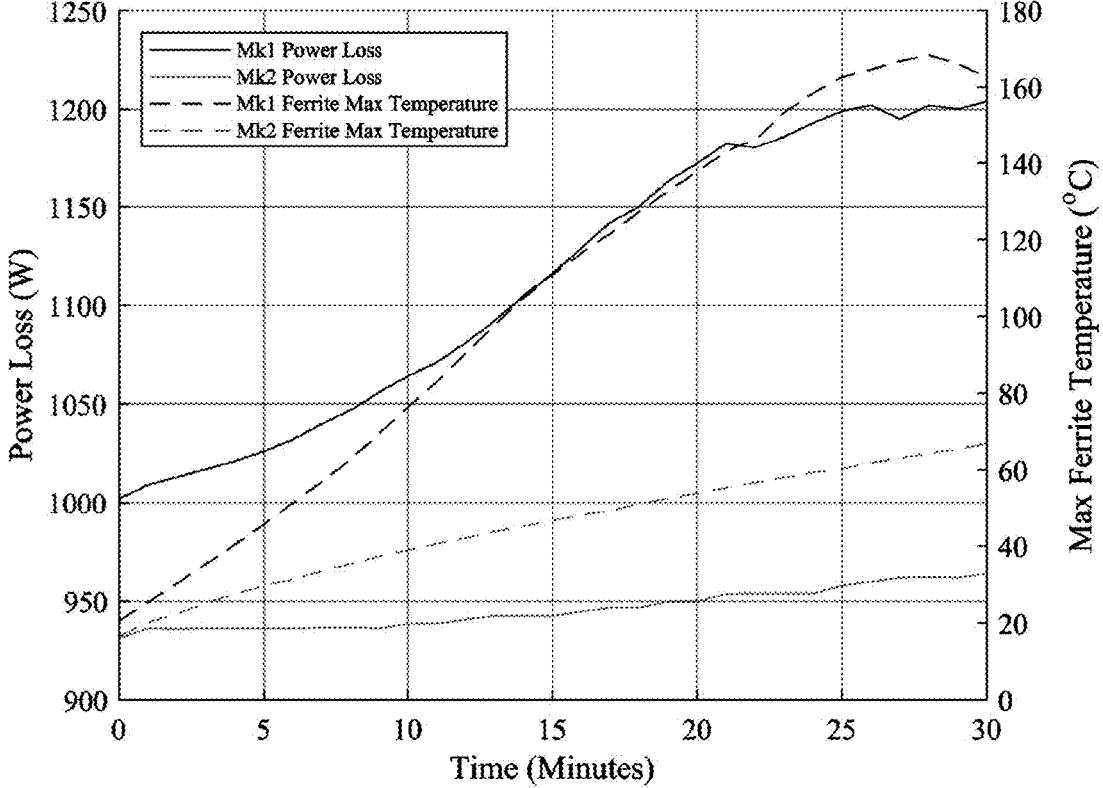
FIG. 16 show a graph comparing DC-DC power loss and maximum temperature of ferrite structure for Mk1 & Mk2 GA magnetics over 30 minutes.

The maximum temperature of the ferrite structure and system loss at the DC supply were measured at 1-minute intervals. The results in FIG. 16 show the Mk2 GA has 20% less loss and a 60% lower maximum ferrite temperature compared to the Mk1. These results agree with the discussion above where the Mk2 prototype has a lower average flux density, std. deviation in B between ferrite tiles and lower ΔB compared to the Mk1. The Mk2 design was powered at rated volt-amps for a further 30 minutes (60 minutes total), and the maximum ferrite temperature remained below 100° C.

Ideally the pad quality factor (Q) would be measured during operation and a power analyzer used to evaluate the efficiency of each part of the system, however this equipment was unavailable. Instead, the LCL tuning network was slightly modified to maintain identical 11 and volt-amp ratings in the primary inverter for both the Mk1 & Mk2 experiments. This ensured the losses in the inverter were almost identical between tests and enabled a comparison between the overall system loss in the Mk1 & Mk2 magnetics.

36 kW Power Transfer Experiment

The power transfer experiment was performed at 36 KW, for the reasons outlined earlier, with the secondary H-bridge operating as a passive rectifier. With respect to FIG. 15, Table V shows the component values and parameters for the power transfer test performed with the magnetics separated by a ground clearance airgap of 210 mm and misaligned by −75 and −100 mm in the X and Y axis respectively. This places the system at worst case coupling and leakage flux conditions.

TABLE V

| COMPONENT VALUES/PARAMETERS FOR POWER TRANSFER TEST | | | | | |
|---|---|---|---|---|---|
| | Primary | | Secondary | | System |
| $L_1$ | 18.2 µH | $L_2$ | 17.3 µH | f | 85 kHz |
| $C_{1s}$ | 263 nF | $C_{2s}$ | 304 nF | $k_{(min)}$ | 0.133 |
| $C_{1p}$ | 536 nF | $C_{2p}$ | 533 nF | $V_{dc}$ | 700 V |
| $L_{1a}$ | 7.5 µH | $L_{2b}$ | 7.4 µH | | |

As shown in FIG. 15, the input 12 and output 13 DC bus were connected in parallel. This allowed rated power transfer to occur between the primary and secondary while the DC power supply only supplied losses to the system.

An experimental setup was used which had the magnetic flux probe in the XZ plane along the +Y axis from the center of the VA. The GA and VA pads are arranged facing each other in the XY plane and separated by a distance in the Z axis. This detection plane is chosen as it is closest to the GA windings under maximum misalignment and therefore exhibits the highest leakage flux. It should be noted leakage flux was recorded 800 mm from the VA center for validation purposes, although the target leakage <15 µT was at 950 mm from the VA center as discussed in above.

The FEA simulation complement the experiment. Table VI shows coupling and self-inductance measurements agree within a 3.7% difference and these practical results validate the FEA models.

TABLE VI

| Simulated vs measured Coupling and Self-inductance (Mk2) | | | | |
|---|---|---|---|---|
| | $k_{12(min)}$ | Δk | $L_1$ | $L_2$ |
| Simulated | 0.131 | 0.121 | 18.9 µH | 17.7 µH |
| Measured | 0.133 | 0.123 | 18.2 µH | 17.3 µH |

The primary and secondary scope captures during power transfer can be measured. The measured coil currents waveforms (I1 and I2) can and were used in the accompanying FEA simulations.

Discussion of Experimental Results

Table VII shows a summary of the simulated (ANSYS or PLECS models), and measured results for the 36 kW power transfer test. Also shown are extrapolated results for a 50 KW power transfer experiment achieved by increasing Vbus to the rated system voltage of 800 V. The extrapolated results are obtained by applying a factor of 800/700 to the experimental 36 KW results and were confirmed using PLECS. The output power will be slightly below 50 kW, however simulations show this could be improved by operating the secondary rectifier in active rather than passive mode.

The simulated 36 KW PLECS/ANSYS characteristics match within 3.7% of the measured results. The system DC-DC efficiency is 93.7%, with the difference in simulation losses due to ideal switches used in the inverters and fixed ohmic loss assumptions.

Figure 17:
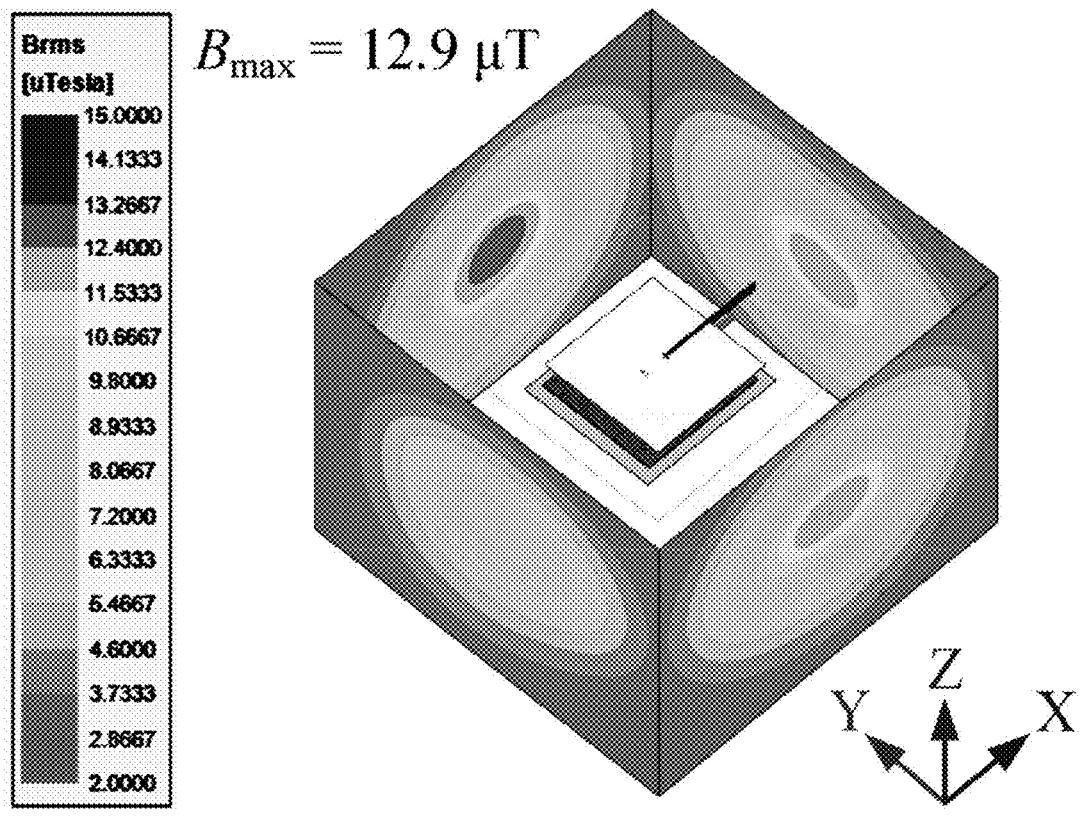
FIG. 17 is FEA leakage flux 950 mm from VA center while transferring 50 kW at the maximum misaligned position.

By using the FEA model with extrapolated pad currents of 214 and 208 A, the maximum leakage flux 950 mm from the VA center is less than 13.3 µT which is lower than the 15 µT limit for members of the public who have CIEDs. The FEA model and 50 KW leakage results are shown in FIG. 17. The model shows transmitting and receiving pads axially aligned, with power cabling running to the top right of the picture for the wireless power system. The surrounding box shows the relative magnetic field strength during operation.

TABLE VII

| Simulated (36 kW), Measured (36 kW) and Extrapolated (50 kW) Results | | | | |
|---|---|---|---|---|
| | $I_1$ | $I_2$ | $V_1$ | $V_2$ |
| Simulated | 185 A | 182 A | 1.8 kV | 1.7 kV |
| Measured | 187 A | 182 A | 1.8 kV | 1.7 kV |
| Extrapolated | 214 A | 208 A | 2.1 kV | 1.9 kV |
| | $VA_1$ | $VA_2$ | $P_{in}$ | $P_{out}$ |
| Simulated | 333 kVA | 309 kVA | 39.0 kW | 37.1 kW |
| Measured | 337 kVA | 309 kVA | 38.2 kW | 35.8 kW |
| Extrapolated | 440 kVA | 404 kVA | 49.9 kW | 46.8 kW |
| | $P_{loss}$ | $\eta_{dc-dc}$ | $B_{leakage}$ 800 mm | $B_{leakage}$ 950 mm |
| Simulated | 1.9 kW | 95.1%* | 26.4 µT | 11.6 µT |
| Measured | 2.4 kW | 93.7% | 25.4 µT | — |
| Extrapolated | 3.1 kW | 93.7% | 29.0 µT | 13.3 µT |

*Ideal switches used in PLECS and temperature variation effect on ohmic loss not modeled, accounts for 1.4% difference between simulated and measured efficiency.

Numerous examples of high-power density IPT magnetics are explored in literature without considering thermal complications and their mitigation. In this disclosure methods of predicting and preventing thermal failure of candidate high-power magnetics during the initial FEA design stage have been presented. Two ferrite designs were simulated, built, and tested to prove the effectiveness of the proposed methods. The result is a 50 KW system that has improved thermal performance. The techniques are applicable to other systems, in particular high-power systems FEA models of B distribution were compared with thermal imaging experiments for each ferrite topology while operating at rated current. These comparisons proved the significance of simulated B hotspots in the ferrite structure. It showed their impact on system loss, temperature differentials across individual ferrite tiles, and subsequent mechanical failure. Methods of how these effects can be mitigated were proposed.

Careful ferrite layout ensured gradual B distribution and minimized magnetic hotspots. A technique to reduce loss caused by circulating flux within the ferrite structure while avoiding a reduction in coupling was presented and incorporated into the final magnetics design. The combined techniques resulted in a 45 and 70% reduction in average ΔB and ΔT respectively, and the peak ΔB and ΔT in the ferrite structure are reduced by 68 and 73%. This may allow greater power transfer without excess heat or loss of efficiency.

Power transfer experiments were performed at 36 kW under maximum misalignment conditions and agreed closely with the FEA and PLECS models. System efficiency of 93.7% was observed. Leakage fields below 13.3 μT can be achieved when the system is operated at 50 kW under maximum misalignment.

In particular it was found that arranging the ferrites to reduce circulating flux (i.e., flux circulating in the ferrite, or at or near the plane of the ferrite) while maintaining the levels of coupling flux (i.e., flux extending away from the pad or ferrite to transfer power to a corresponding pad) was advantageous. This was achieved using a variable spacing of the ferrites. A distributed spacing of the ferrites (i.e. a substantially constant gap between ferrites across the pad) was shown in FIG. 12b reduced the circulating flux when the gap was sufficiently sized (gaps of 0.1 mm, 0.5 mm and 1.0 mm were shown, and gaps between any two of these values may be sufficient) however larger gaps may be used dependent on the particular pad and power transfer level. However, the substantially constant gap resulted in a smaller coupling factor. In some cases the larger gaps may have a variable width, for instance to allow the exit of the winding conductor or cable.

Figure 12A:
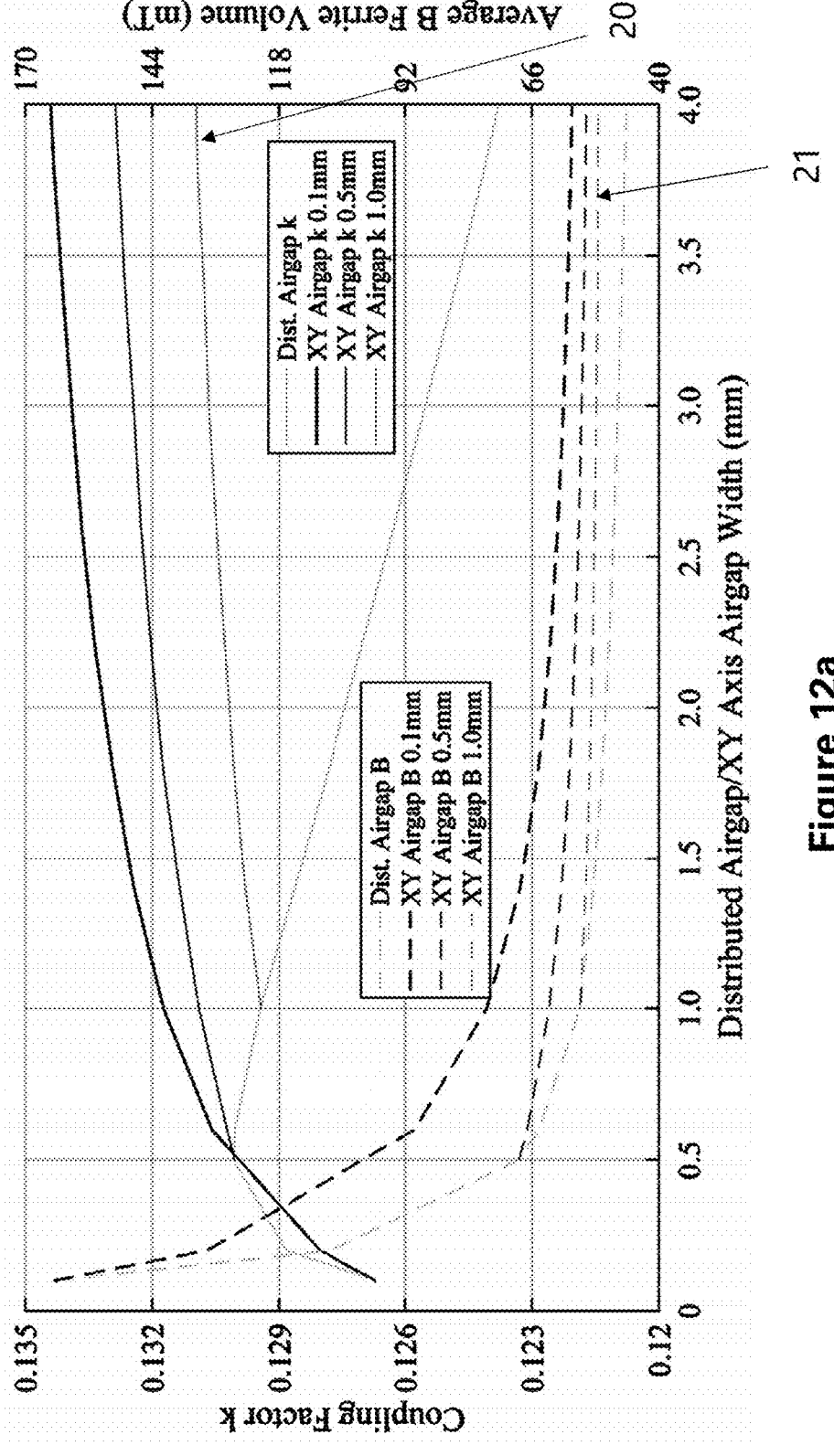
FIG. 12 shows a) Graph comparing k and average B within ferrite structure as a function of distributed airgap or lumped XY airgap size, (b) Ferrite model with increasing distributed airgap size, and (c) Ferrite model with fixed distributed airgap and an increasing lumped airgap size along the X and Y axis.
Figure 12B:
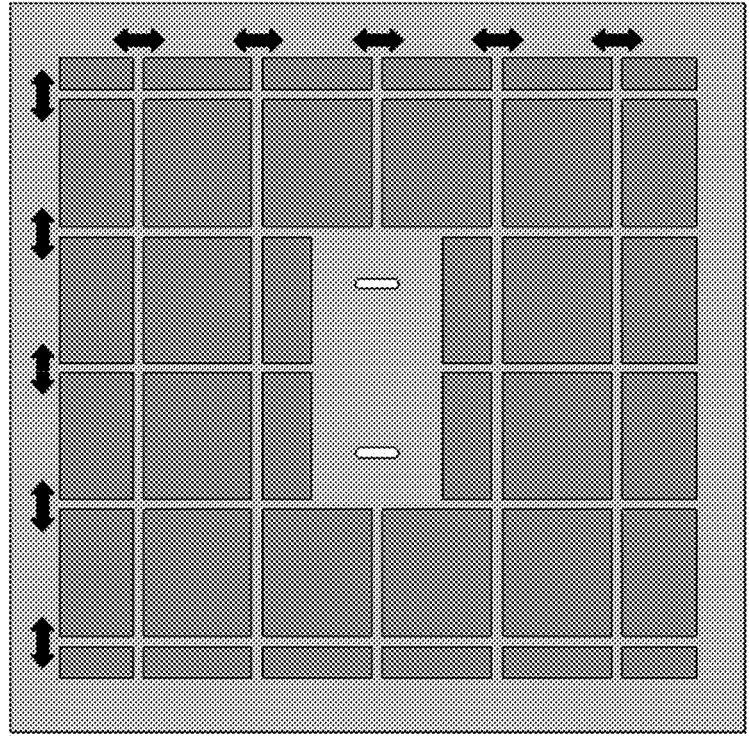
Figure 12C:
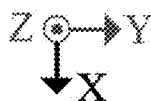
Figure 12C:
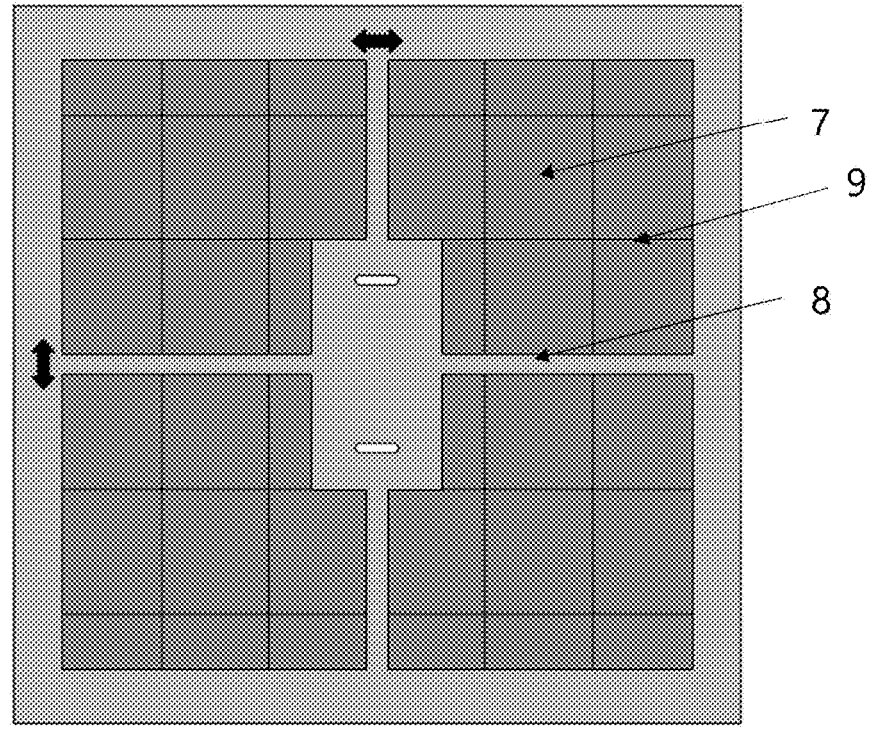

Introducing at least one larger gap 8 between the ferrite tiles provided a further performance improvement. The larger gap (or plurality of larger gaps) divided the ferrite (or other magnetically permeable material) placing a break in the circuit of the circulating flux. In some cases the larger gap would create at least portion of the ferrite. For instance, FIG. 12c shows 4 sections of ferrite divided by gaps on the X and Y axis. In an alternative case only the lower gap on the X axis may be present but may be wider to provide sufficient loss in the circulating flux. The specific dimensions of the larger gaps (i.e. between sections) and smaller gaps (i.e. between each ferrite) are configurable dependent on the type of pad/ferrite, the power transfer required, dimensions of the pad/ferrite and pad/ferrite structure. In the particular example shown the larger gaps or spaces with approximately 4× (4 times) larger than the smaller gaps or spaces. However the larger gaps may be at least 2×, 3×, 4×, 5×, 8×, 10× or 20× larger than the smaller gaps. In some cases the gaps may be filled with a polymer or support structure to support the location of the ferrite block or material. The gaps may be made of a material with a relative permeability similar to air.

The circulating flux in the ferrite may be produced by the fields generated by current flow through the vertical cabling portions of the winding inlet and/or outlet/exit from the winding passing through the ferrite layer as shown in FIG. 11a. However because it is typically impractical to exit above the winding the larger gaps may provide a new option. Exiting through one or a plurality of the larger gaps reduced the vertical distance the cabling travels through the ferrite (and the corresponding field generated) and may allow even further reduction in circulating flux.

In some cases the larger gaps are not arranged along the axes as shown in FIG. 11. Because the larger gaps are configured to reduce circulating flux the gaps should cross the areas in which circulating flux is present while avoiding the coupling flux. For the circular pad example of FIG. 11 the coupling flux extends outwards and up from the centre of the pad, so the larger gaps parallel to this direction have limited effect, while because the gaps are perpendicular to, or extend across the circular flux path between the centre and edge of the ferrite, the circular flux path is impeded.

Figure 13:
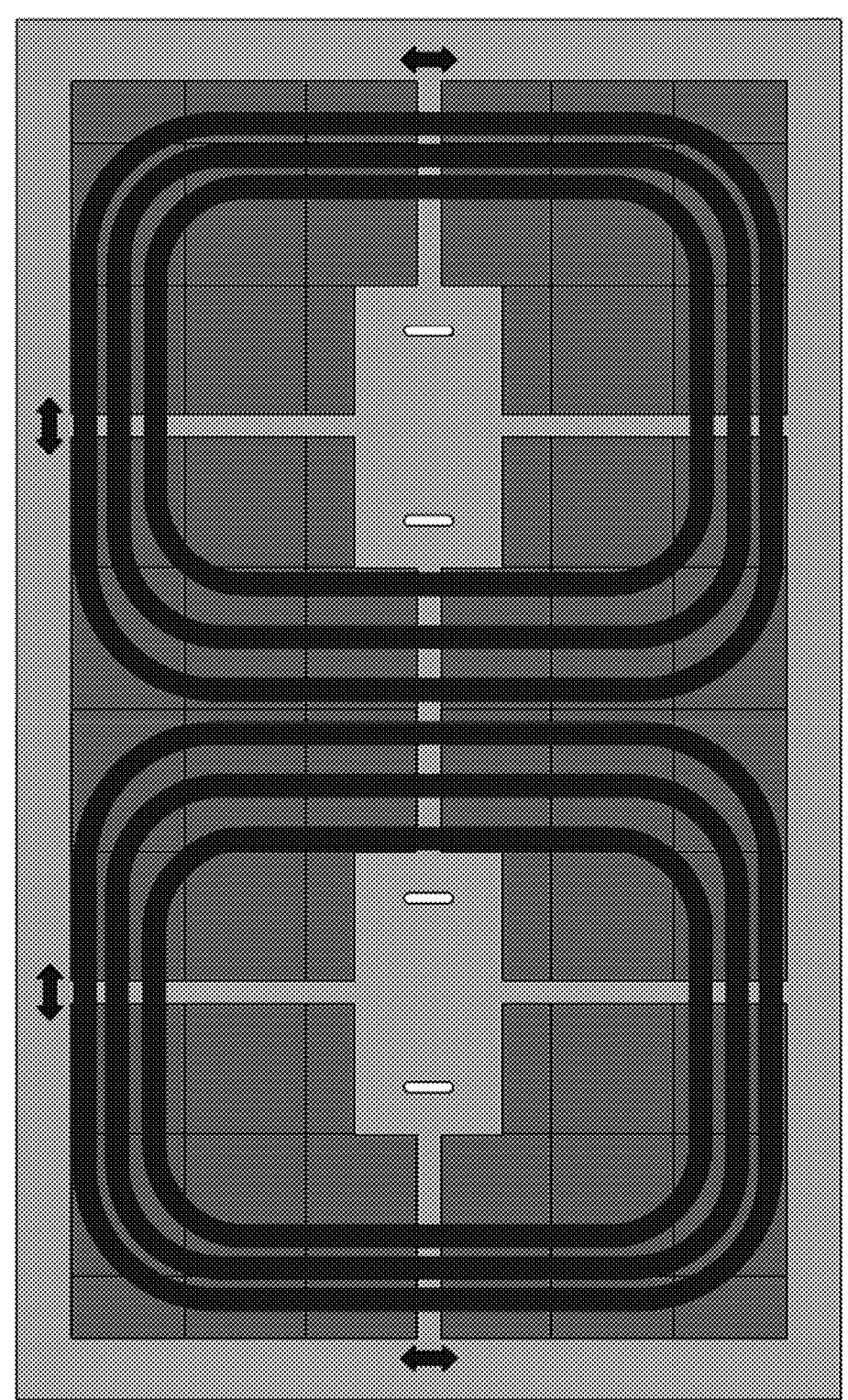
FIG. 13 is an example of a core structure of a Double D pad topology.

FIG. 13 shows an alternative arrangement for a pad with two coils adjacent each other where flux is configured to arch between the poles of the coils. This may be referred to as a DoubleD pad. The ferrite layer has six portions separated by relatively large gaps, each portion comprising a plurality, or at least two blocks of magnetically permeable material separated by a relatively small gap (some gap is typically required due to manufacturing tolerances). In other cases only some of these larger gaps may be used, or further portions used.

Figure 14:
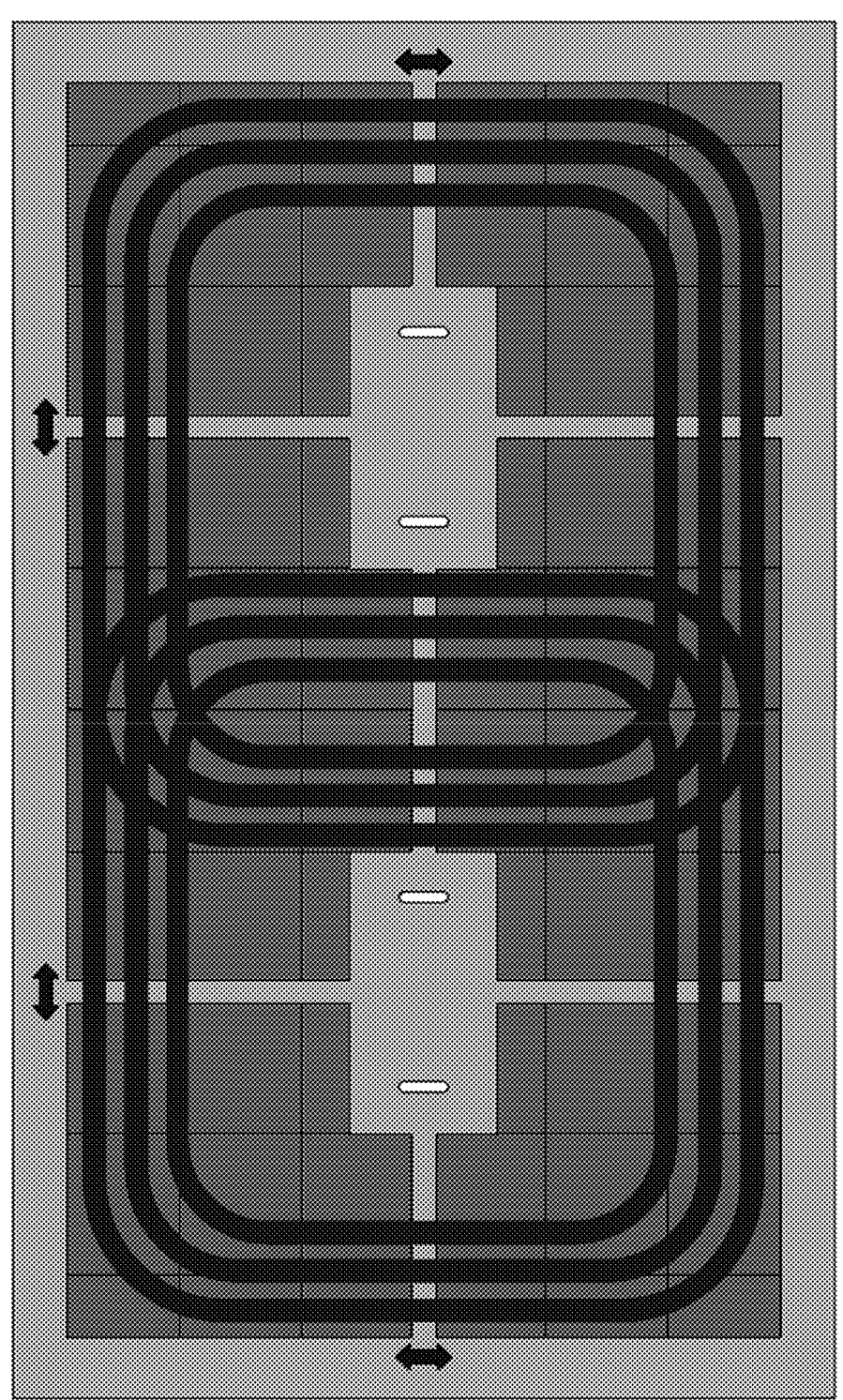
FIG. 14 is an example of a core structure of a Bipolar pad topology.

FIG. 14 shows an alternative arrangement for a bipolar pad, where two coils overlap, particularly where the overlap is sufficient to decouple the two coils. Again 6 portions of ferrite are shown separated by relatively large spaces. The large spaces are arranged to prevent or reduce the flow of circulating flux in the ferrite while allowing the coupling ferrite to continue to flow. In other cases the pole regions (i.e., the regions in the centre of the windings or coils) may have a different shape or configuration without loss of performance due to the changing of the gaps between ferrites.

Where pads are configured with a flux pipe, or regions expected to contain or carry large amounts of coupling flux it is advantageous no to have larger gaps, or to locate the larger gaps or spaces in directions parallel to the direction of the coupling flux, so as not to disturb it. For example, the centre gap in FIG. 13 is aligned vertically, parallel to the direction of flux in the ferrite between the poles of the windings.

Pre-Stressing of Magnetically Permeable Materials Such as Ferrite

Figure 6A:
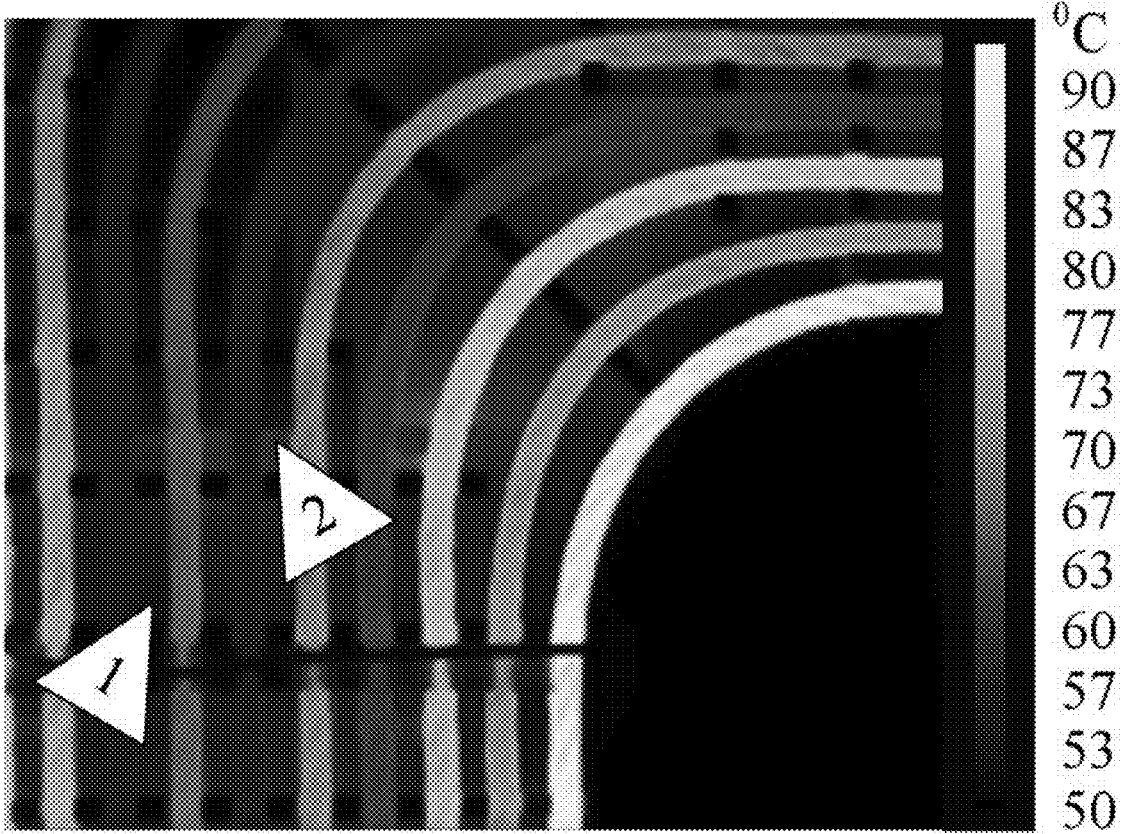
FIGS. 6(a) and (b) show thermal images taken at 30-minute mark of Mk1 prototype operation which relate to regions outlined in (c) and in FIG. 5a. (d) shows a thermal image of Mk2 prototype. Points 1 through 6 are 52, 70, 96, 174, 167, and 105° C. respectively.
Figure 6B:
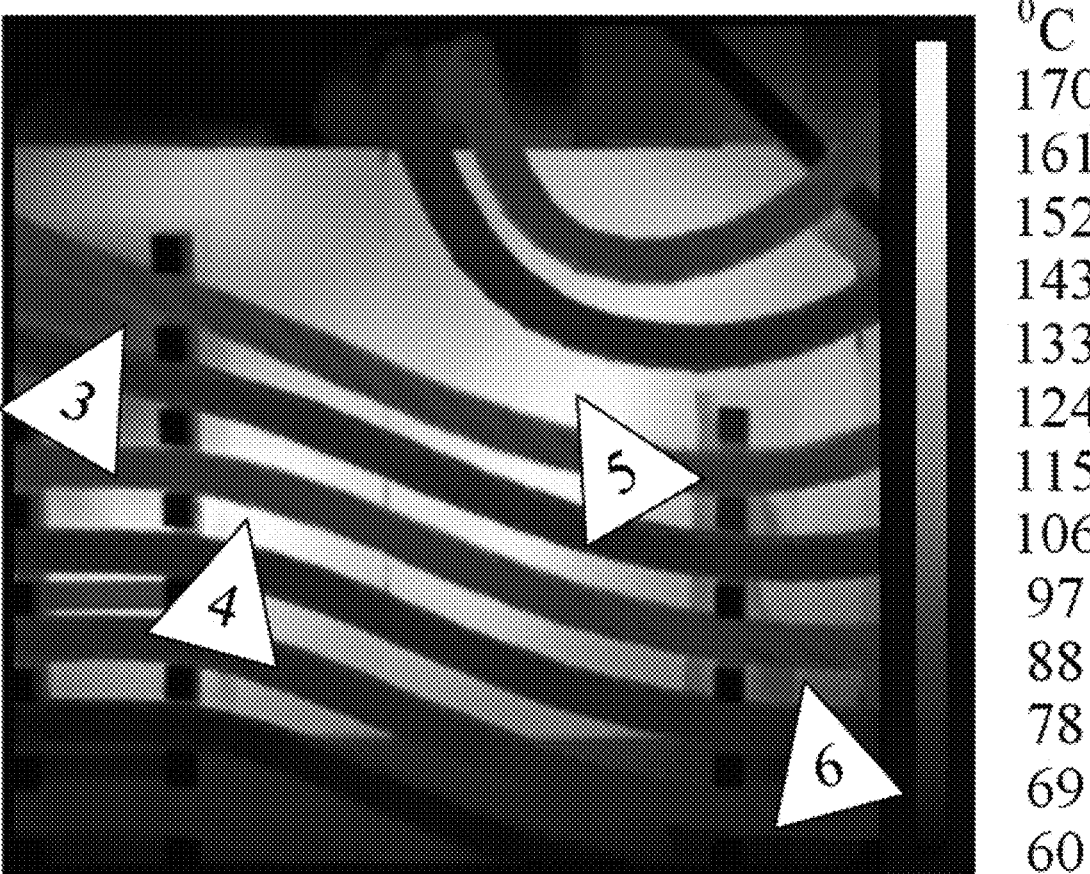
Figure 6C:
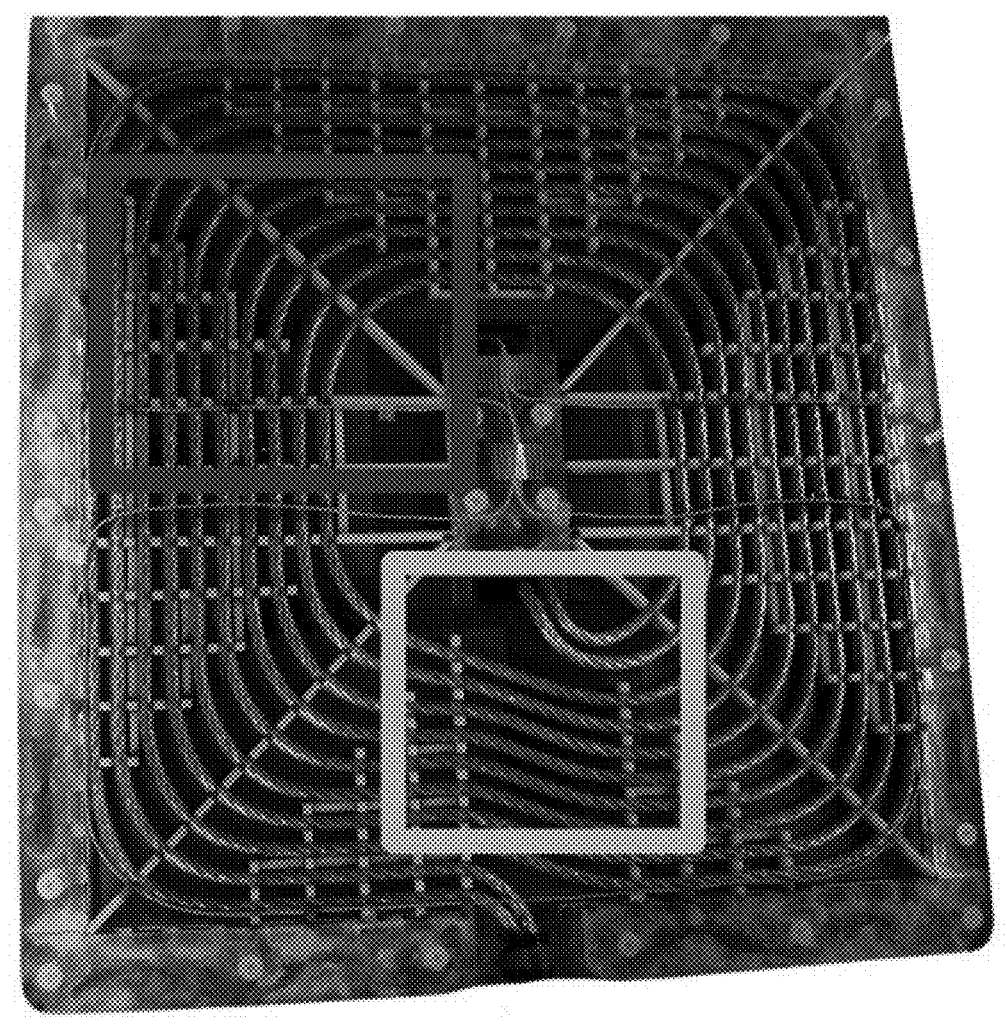
Figure 6D:
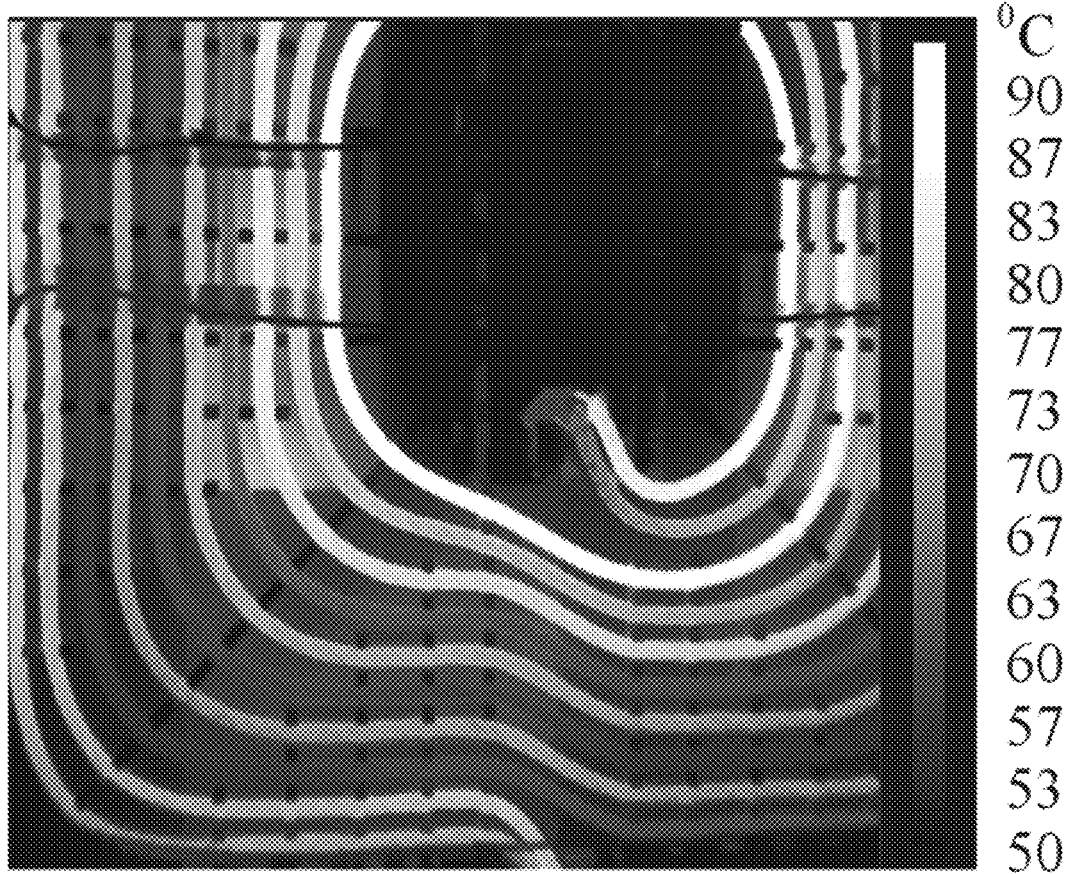

Ferrite cracking is disadvantage because of the loss of performance of the system. Ferrite cracking in the Mk1 prototype occurred near the hotspot indicated by FIG. 5(a) outlined in red and is shown thermally in FIG. 6(a). From an 18° C. ambient temperature, ΔT at points 1 and 2 in FIG. 6(a) are 34 and 52° C. respectively after 30 minutes. Based on (5), the regions of ferrite around point 12 undergo a 50% greater thermal expansion compared to point 1.

$$\Delta L = La\_L \, \Delta T \qquad (5)$$

Where ΔT is the change in temperature, α_L is the coefficient of linear expansion, L is the initial length of the ferrite along the dimension of interest, and ΔL is the change in length.

FIG. 5(a) shows a large B hotspot on the Mk1 ferrite outlined 3. The same region is shown thermally in FIG. 6(b). After operating for 30 minutes, markers at points 3, 4, 5 and 6 see a ΔT of 78, 156, 149 and 87° C. from ambient respectively. This equates to at least a 70% greater thermal expansion at points 14 and 15 compared to 13 and 16 respectively. After 30 minutes the ferrites under these points fractured. Continued operation of the Mk1 prototype showed the hotspots re-localize as the flux paths moved to either side of the fractures. This resulted in further ferrite cracking as the temperature differentials shifted.

The manufacturing of ferrite blocks used in IPT pads, can introduce localized defects within the block. When subjected to magnetic fields, the temperature around these defects can increase significantly beyond the average temperature of a block. This thermally induced stress can be following in order to pre-crack or destress the ferrite blocks. In this way flux paths can move about the fractures, potentially causing more fractures, but finally resulting in a destressed block that is less prone to having hot spots.

Horizontal and vertical cracks may form in ferrite tiles during use. The fractures may be partial (i.e. removing corners of tiles) or separate the tiles into larger pieces. Multiple cracks may form in single tiles to break the ferrite into two, three or more pieces. It has been found through experimentation that typically fractures started at or directly followed a B hotspot instead of, for instance at visible defects in the sintering process. This observation further supports that removing B hotspots and reducing ΔB can prevent thermal failure of the ferrite structure. In other cases the cracking and/or hotspot formation may be caused or exacerbated by impurities in the ferrites that, as shown in FIG. 7, are not visible before use.

Thus, the present disclosure also provides a method of destressing a wireless power transfer pad magnetic structure. The method includes configuring a plurality of ferrite blocks together to provide a magnetic structure, thermally pre-cracking the ferrite blocks. The ferrite blocks may be encased in a matrix of support material (e.g., a polymer resin) to avoid introducing large airgaps and thus negatively impacting the performance of the magnetic structure. The thermal pre-cracking of the ferrite blocks includes energizing the blocks for a period of time until the spot temperature around the local defects in the blocks rises over 90° C. and go into thermal runaway. The temperature may be between 90 and 100 degrees centigrade at or near the thermal runaway point. In some cases the temperature used depends on the material, while ferrite typically goes into thermal runaway at or near 90 degrees other magnetically permeable materials will have a different temperature. Once the blocks have been thermally pre-cracked the temperatures of the local defect areas will reduce and the temperatures will settle at a new steady-state indicating successful destressing.

After destressing the block can be encased in a polymer, ready for use in an IPT pad. This may also apply to other magnetic materials, however, the threshold temperature may differ. The particular cracking or shape of the cracks will be ferrite dependent, largely based on internal structures or variations in manufacture.

In other forms of the present invention, the pre-cracking of the ferrite blocks may include energizing the blocks for a period of time. The time period, or soak period, may vary dependent on the specific configuration of the ferrite block (see various embodiments detailed below). However, for a thinner ferrite block that soak period might be quite short, around 30 minutes, or 1 hour, or even a couple of hours. For thicker blocks the soak period may be many more hours. For example, between 6 to 8 hours. Once the blocks have been pre-cracked they are preferably encased in a polymer.

In some cases the blocks may be potted, encased or partially encased for the pre-cracking. This reduces loss of ferrite and manufacturing complexity for assembly the pre-cracked ferrites. For example the blocks may be potted, or coated in resin, polymer or other support matrix, then pre-cracked independently or with a plurality of blocks, then encased in a polymer to from a combined pad (i.e., a pad formed from multiple ferrite blocks or tiles). In other cases the combined pad may be formed from the ferrites first (for example by encasing the ferrites in a matrix of support material), and the pre-stress method can occur in the complete pad (i.e. using the pad structures to apply to energizing fields or soaking). This may reduce the complexity in combining the pre-stressed ferrites.

The methods described above may also apply to other magnetic material, however, the threshold temperature may differ. This method can also be applied to other materials such as nanocrystalline alloys. Various nanocrystalline allows and/or soft magnetic materials are currently known including FINEMET®, NANOPERM®, HITPERM®, and NANOMET®. After the block has cracked—due to the hot spots—the block settles back to a desired operating temperature. Then, once energized again it is found with experiments that the block settles at that operating temperature without further cracking. Meaning once in situ and in use the block will not suffer further hotspots and cracking and will be more stable in operation.

Figure 18:
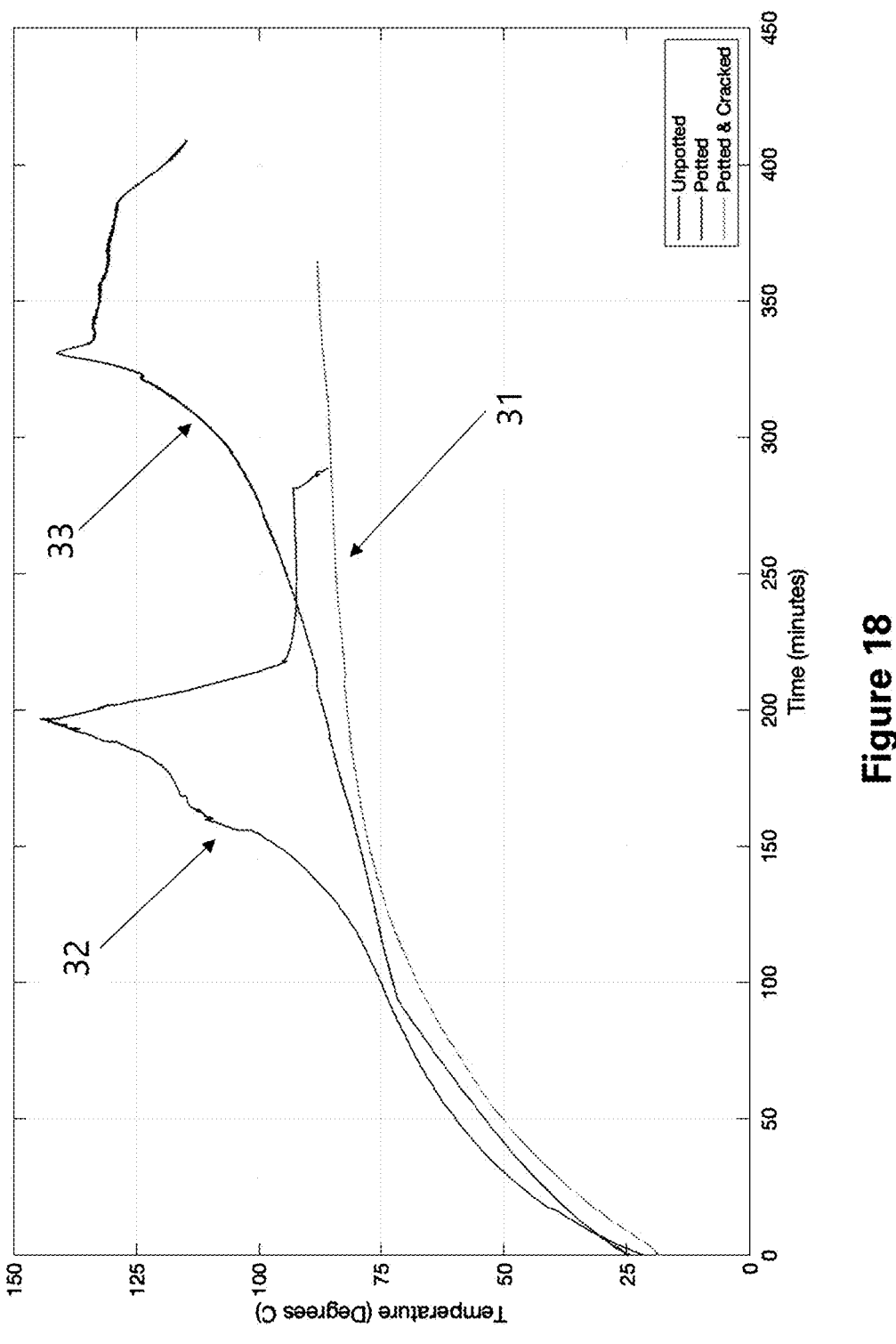
FIG. 18 shows temperature curves and thermal runaway in ferrite blocks under different conditions.

For example, as shown in FIG. 18, experiments were conducted on ferrite blocks, T(Mid_Potted) 33, T(mid_unpotted) 32 and T(mid_potted_cracked) 31. The temperature of the blocks are shown over time. For the curve labelled 31 the ferrite block (T(mid_unpotted)) was unpotted (it wasn't encased in any resin, polymer or the like) and the curve shows a sharp rise in temperature over about 85/90° C. Then thermal runaway can be seen. For the curve 33 the ferrite block (T(Mid_Potted)—one which the blocks were potted-encased) takes longer to reach the thermal runoff temperature. Showing that the encased ferrite block takes longer to reach thermal runoff. For curve 31, the ferrite block (Tmid_potted_cracked—where the ferrite block had been destressed by way of the method described above—the curve shows that the cracked and then potted ferrite block does not go into thermal runaway—the destressed block is thus more thermally stable.

Figure 19:
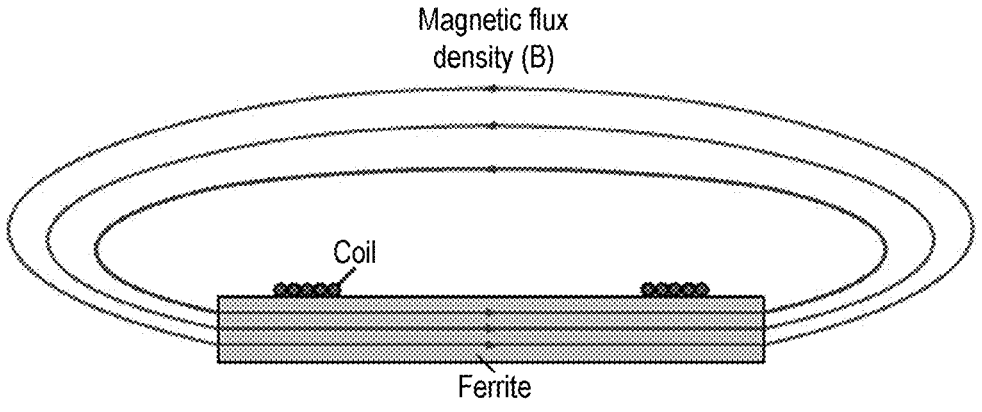
FIG. 19 shows a magnetic field generated by a coil above a block of ferrite.

Advantageously the process of pre-stressing or pre-cracking the ferrite blocks before potting and/or using them in a pad increased the tolerance of the ferrite block to use. For instance, prior ferrite blocks required that magnetic field was kept below saturation to avoid thermal breakdown. However, it was found that an even lower field was required due to hotspots causing thermal runaway in the ferrite resulting in breakdown of the ferrite well before magnetic saturation was achieved. While it is possible to address this by using more ferrite or operating lower power transfer (and therefore smaller fields) this limits the pad performance. Through the use of the described method of pre-stressing each of the one or plurality of ferrite slabs the hot spots or impurities are ameliorated before the ferrites are used in the pad for power transfer. Interestingly this pre-stressing then protects the ferrites during later use or increases their ability to handle large magnetic fields and/or currents enabling improved operating performance, as shown by FIG. 19.

For example a ferrite may have a theoretical saturation threshold of 0.3H. However, due to the danger of thermal runaway (which we have found to be dependent on cracking and/or hotspots) the pad was previously operated at a much lower field strength, say 0.2H or 0.15H. The pre-stressing of the ferrite described above allows cracks to form at imperfections in the ferrite but surprisingly then creates ferrite which is stable at higher fields without thermal runaway.

Ferrite Block Elements

Ferrite blocks or tiles in IPT pads are usually used in magnetic components to shape the magnetic field. In some cases the ferrite blocks may be replaced with other suitable magnetically permeable material. When a coil is energised with an AC current above a block of ferrite, a magnetic flux density (B) is generated as shown in FIG. 19. While this describes concepts with respect to a single ferrite block or tile the same concept can be applied to at least one, a plurality or all of the blocks in a ferrite pad, or for a larger ferrite pad or shape directly (or other magnetically permeable material).

Figure 20:
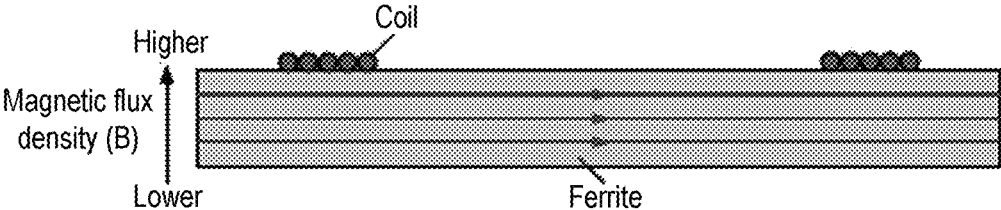
FIG. 20 shows the magnetic flux density distribution within the ferrite block.

Within the ferrite block, the magnitude of the magnetic flux density decreases as the magnetic flux gets further away from the coil as shown in FIG. 20 by the width of the arrows through the magnetically permeable layer. This results in the parts of the ferrite block closer to the coil carrying the majority of the magnetic flux with other parts of the ferrite block not necessarily contributing as much.

Figure 21:
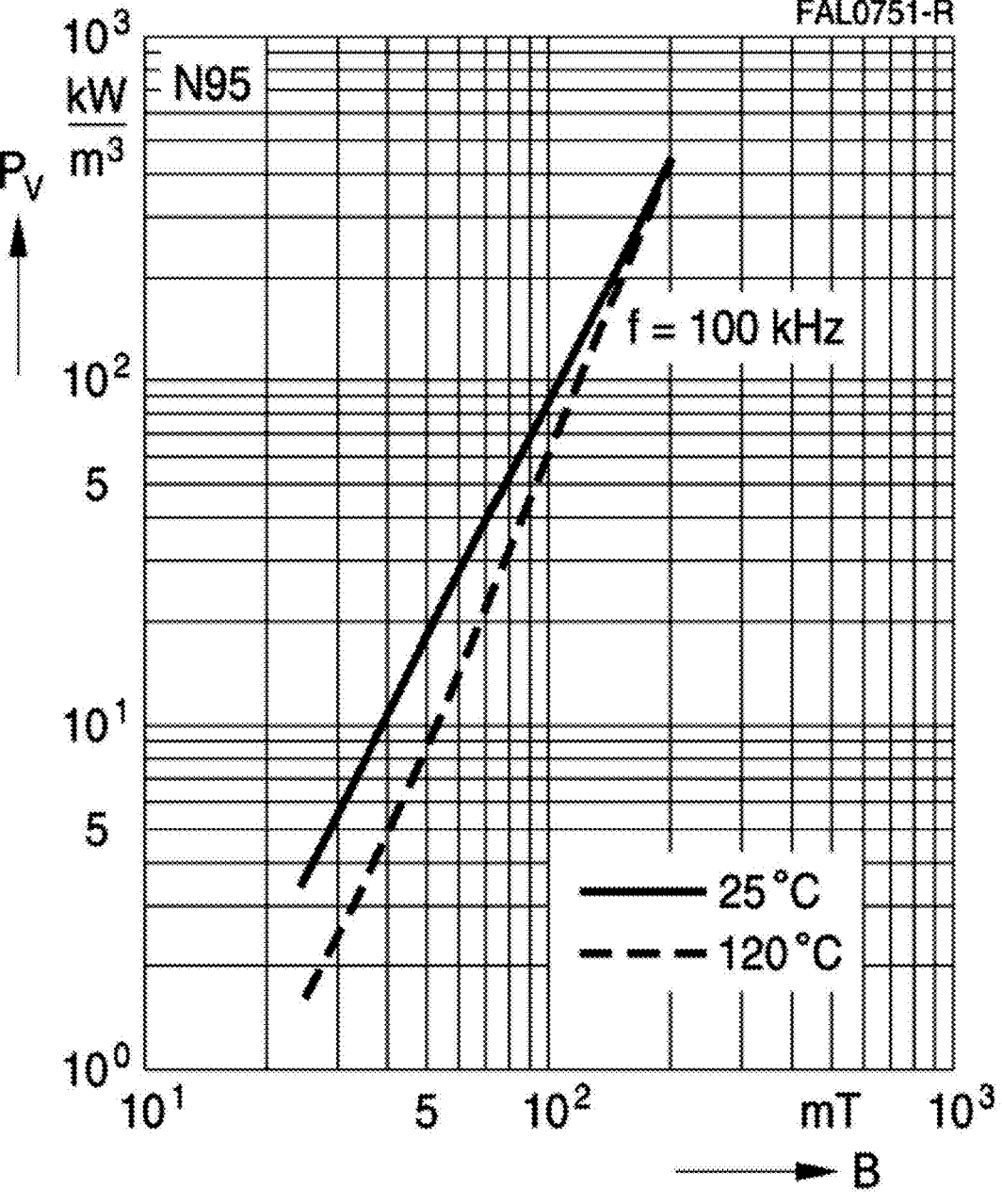
FIG. 21 shows a plot of TDK N95 ferrite loss against magnetic flux density.

Ferrite loss increases exponentially with magnetic flux density B as shown in FIG. 21, so improving the uniformity of the magnetic flux density decreases the overall power loss in the ferrite. This allows the ferrite to be used more effectively within the given volume. In some cases this will also improve the thermal performance of the ferrite block because the magnetic field will not be as concentrated in the higher layers of the block.

Several methods can be used to uniformise the magnetic flux density within the ferrite block. These methods may include providing multiple layers of ferrite elements. The modification of the permeability of the ferrite in the vertical direction (or as the ferrite block moves away from the coil) enables the magnetic field density to be encouraged further into the ferrite block.

Figure 22:
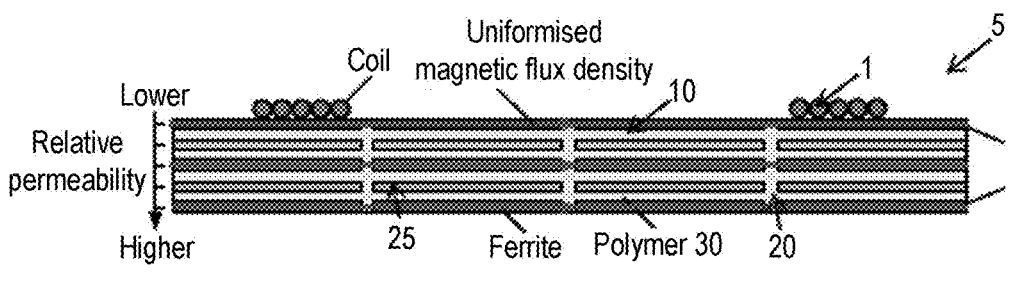
FIG. 22 shows Layers of thin ferrite blocks with different relative permeability.

A first method, and preferred embodiment of a ferrite block 5 of the present invention, is to layer thinner blocks of ferrite as shown in FIG. 22. Although the example is described with ferrite it is clear that alternative magnetically permeable materials may be used. In particular there is ongoing research into nanocrystalline allows and SMCs which can be designed to achieve specific requirements. Both flaked and standard nanocrystalline alloys are available, where flaked materials have been crushed to break up the surface of the ribbon to stop eddy currents paths and lower the eddy current loss. Alternative materials may have improved thermal capabilities or magnetic field saturation levels, although the effect of loss must also be considered.

FIG. 22 shows a plurality of ferrite blocks or bars or other magnetic material such as soft magnetic composites (SMCs) or differing layers and constructions of nanocrystalline alloys 25 (and in some embodiments narrow ferrite tapes or other magnetic material may be used, either layers of tapes together or individually) with increasing relative permeability the further away from the coils 1 they are, may be layered or stacked to make a block of ferrite 5 for use with an IPT pad. The magnetic flux density across the block is uniformised as the relative permeability increases inversely proportional to the distance from the coil 1.

As shown the thin ferrite bars or other magnetic material 25 are enclosed in a supporting matrix, such as polymer 30 to hold the structure together. However, other methods apparent to those skilled in the art may be used. The density of ferrite or magnetic material provided can be configured using either the relative size and/or spacing of the elements within or between layers. It is possible to use any one of tapes, powders, particles or sands containing magnetically permeable materials to form more complex structures. For instance, a magnetically permeable powder may be distributed through a support medium or polymer to create a variable permeability. In some instances a tape may be used to build up a ferrite structure. For example by winding the tape in particular direction around a mould or adding more layers on some tiles or blocks than others. Alternatively applying ferrite/magnetically permeable and non-ferrite/ magnetically permeable tape in changing ratios can create a desired density of ferrite.

Figure 23:
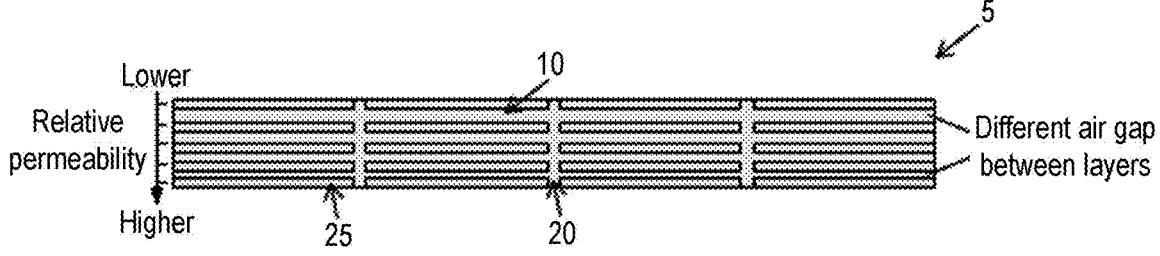
FIG. 23 shows layers of ferrite blocks placed with different air gaps to uniformise the magnetic flux density.
Figure 24:
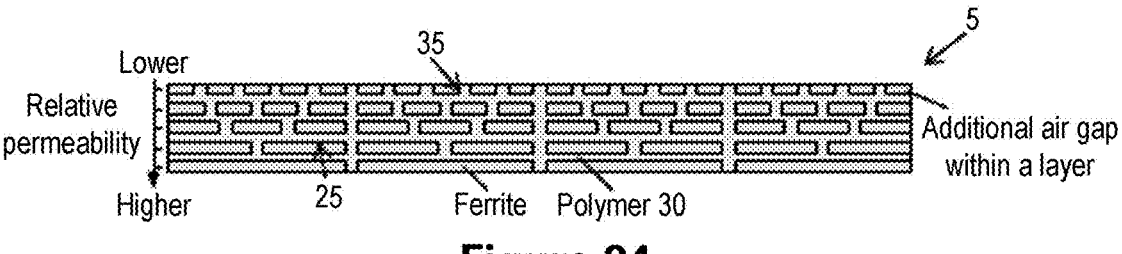
FIG. 24 shows layers of thin ferrite blocks placed with reduced volume to uniformise the magnetic flux density.

Second and third embodiments of a ferrite block 5 of the present invention, including layering a plurality of ferrite blocks or bars 25 to uniformise the magnetic field, are shown in FIG. 23 and FIG. 24.

In the embodiment of FIG. 23 there are both horizontal 10 and vertical 20 gaps between the layered ferrite bars 25. The layers of ferrite bars are carefully constructed such that relative permeability increases the further away from the coils (the same placement of the coils would occur in FIGS. 23 and 24, as is in FIG. 22). The arrangement could be achieved by having a decreasing gap between the layers so as to effectively have a greater density of ferrite as you move away from the coil. Alternatively a different magnetically permeable material could be used, with a greater permeability of material used further away from the coil. In some cases the vertical gaps may not be present, may be very small, or may be offset in each layer. In a further example the gap (referred to as an air-gap but including any relatively less permeable material (such as a material with a permeability close to air), such as a polymer.

In the embodiment of FIG. 24 there are additionally air gaps (horizontally) 35 within each layer, this may give further flexibility of the design and the ferrite block 5 itself. Additional flexibility of the block 5 will lend itself to better use within a roadway and a potential reduction in cracking of the block 5 with vehicles driving over the roadway. For example the flexibility may be due to the polymer supporting the ferrite allowing the pad to bend while the ferrite remains substantially flat. The additional air-gaps also allow the relative permeability to be changed by having less ferrite in each layer but the same thickness between the layers and the layers themselves. In this way the density of ferrite in each layer is varied with distance from the top surface, or the surface on which the coil is configured to rest. Although vertical breaks are shown in FIG. 24 these are not required in all instances and overlap may be incorporated between layers.

Again, the plurality of ferrite or other magnetic material bars or layers is preferably appropriately encapsulated to ensure permanent fixing of the distances between the bars, such as in a polymer or other appropriate materials.

When the magnetic flux density has been uniformised, the layered sheets gives some advantages in material selection and placement over a typical ferrite block. However individual, distinct or clearly defined layers are not required in all cases. For example the density may vary continuously throughout the block to provide a higher permeability further from the surface. In other cases there may be ferrite sections or blocks which extend across multiple layers.

Figure 25:
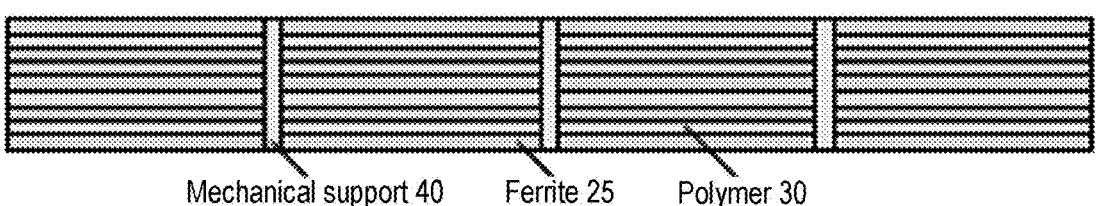
FIG. 25 shows mechanical supports placed within the layered ferrite block.
Figure 26:
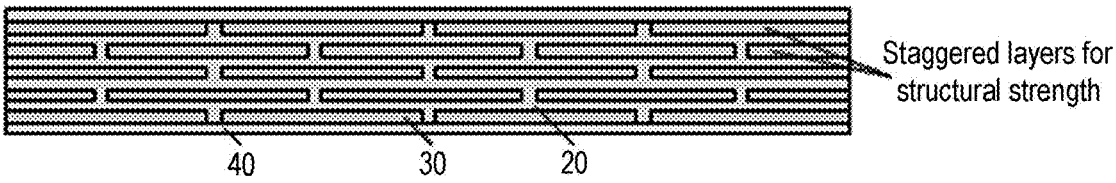
FIG. 26 shows mechanical supports placed around the layered ferrite block. The ferrite blocks are staggered for additional mechanical strength.

In further embodiments of the ferrite block of the present invention, mechanical supports 40 may be placed within or around the layered ferrite blocks 25 as shown in FIGS. 25 and 26.

In FIG. 25 the mechanical supports are shown as a plurality of vertical supports. There may be at little as one or many more, although only three supports are shown in the block. The vertical supports 40 can comprise columns of supporting material or other structural material that mechanically support and/or allow flexibility between the columns of aligned ferrite bars in this arrangement. The mechanical supports may be configured to reduce the forces applied directly to the ferrite, or to reduce the compression or tension felt by the ferrite weight the block.

In FIG. 26 the mechanical supports may be horizontal supports, at the top and the bottom of the layers, or one or more outer surfaces, to provide support for the staggered layers of ferrite blocks 25. In further cases the vertical and horizontal mechanical supports may be used concurrently. In some cases the vertical supports may have a tortuous shape so as to fit around staggered ferrites, such as a zig-zag shape to fit around the staggered ferrites of FIG. 26.

Figure 27:
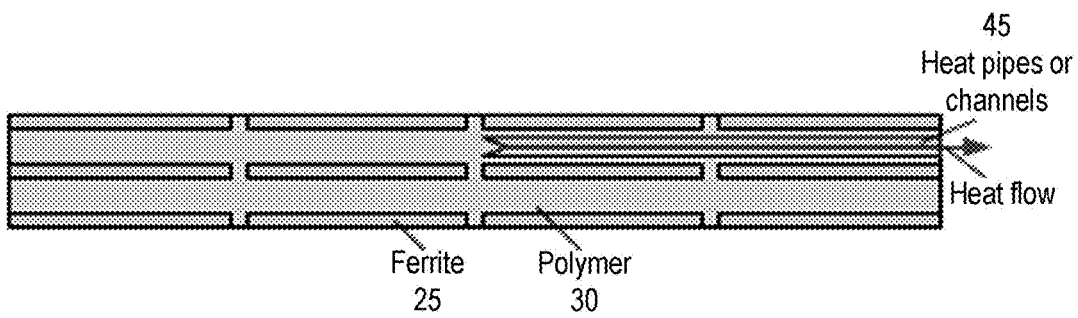
FIG. 27 shows an example of a heat transferring medium placed between the ferrite layers for heat extraction.

In yet a further embodiment, shown in FIG. 27, a ferrite block in the space occupied by the polymer between the ferrite layers may be utilised to transfer heat away. Small channels of horizontally placed heat pipes or liquid/gas cooling channels 45 can be designed to minimise the temperature variation within the ferrite block. In some cases the channels can be aligned to, or configured with, the overall pad shape so as to channel heat over the wider pad and/or into the gaps between blocks in the pad as described previously. The heat transferring medium placed between the ferrite layers allows for heat extraction and can also be designed for structural integrity. It may also be configured to provide spacing to create the non-uniform spacing of the ferrite to adjust the relative permeability.

Throughout the description like reference numerals will be used to refer to like features in different embodiments.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A wireless power transfer pad magnetic structure, comprising a first layer having a plurality of magnetically permeable blocks,
   wherein each neighbouring pair of the blocks in each of neighbouring first and second sections is substantially spaced apart from each other by an inter-block spacing, and
   wherein the first and second sections are substantially spaced apart from each other by an inter-section spacing greater than the inter-block spacing.

2. The magnetic structure of claim 1, wherein each neighbouring pair of the blocks in a third section neighbouring the first section is substantially spaced apart from each other by the inter-block spacing, wherein the third section is substantially spaced apart from the first section by the inter-section spacing.

3. The magnetic structure of claim 2, wherein the third section is arranged perpendicular about the first section with respect to the second section.

4. The magnetic structure of claim 1, wherein the sections are arranged to at least partially surround an associated cut-out of the magnetic structure.

5. The magnetic structure of claim 1, wherein one of the sections is adapted to be located between coil poles.

6. The magnetic structure of claim 1, further comprising a stacked second layer having a plurality of magnetically permeable blocks and having a relative permeability different from that of the first layer.

7. The magnetic structure of claim 6, wherein the layers have different block arrangements.

8. The magnetic structure of claim 6, wherein the layers have different numbers of inter-block spacings.

9. The magnetic structure of claim 6, wherein the layers have different block dimensions.

10. The magnetic structure of claim 6, wherein the layers have staggered block arrangements.

11. The magnetic structure of claim 6, wherein the layers have different materials.

12. The magnetic structure of claim 6, further comprising a stacked intermediate layer having a plurality of magnetically permeable blocks and having a relative permeability between those of the first and second layers, wherein each adjacent pair of the layers has a unique inter-layer spacing.

13. The magnetic structure of claim 6, further comprising a heat transfer part arranged between one neighbouring pair of the layers.

14. The magnetic structure of claim 6, further comprising a support part arranged between and supporting one neighbouring pair of the blocks of one of the layers.

15. A system comprising:
   the magnetic structure of claim 1, and
   a wireless power transfer pad with a coil extending through the inter-section spacing.

16. The magnetic structure of claim 6, wherein the relative permeability of each layer is proportional in magnitude to a distance from the respective layer to a coil side of the magnetic structure.

17. The magnetic structure of claim 1, wherein at least two of the blocks in each section are different in shape.

18. The magnetic structure of claim 1, wherein the blocks in each section are arranged along perpendicular directions.

19. A wireless power transfer pad magnetic structure, comprising a first layer having a plurality of magnetically permeable blocks,
   wherein each neighbouring pair of the blocks in a first section is substantially spaced apart from each other by a first inter-block spacing,
   wherein each neighbouring pair of the blocks in a second section neighbouring the first section is substantially spaced apart from each other by a second inter-block spacing different from the first inter-block spacing, and
   wherein the first and second sections are substantially spaced apart from each other by a first inter-section spacing greater than the first and second inter-block spacings.

20. A wireless power transfer pad magnetic structure, comprising a first layer having a plurality of magnetically permeable elements,
   wherein each neighbouring pair of the elements in each of neighbouring first and second sections is substantially spaced apart from each other by an inter-element spacing, and
   wherein the first and second sections are substantially spaced apart from each other by an inter-section spacing greater than the inter-element spacing.

* * * * *